US008861719B2

(12) United States Patent
Lee et al.

(10) Patent No.: US 8,861,719 B2
(45) Date of Patent: Oct. 14, 2014

(54) METHOD OF GENERATING A RANDOM PERMUTATION, RANDOM PERMUTATION GENERATING DEVICE, AND ENCRYPTION/DECRYPTION DEVICE HAVING THE SAME

(71) Applicant: Samsung Electronics Co., Ltd., Suwon-si (KR)

(72) Inventors: Yong-Ki Lee, Hwaseong-si (KR); Hong-Mook Choi, Bucheon-si (KR); Jong-Hoon Shin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/759,476

(22) Filed: Feb. 5, 2013

(65) Prior Publication Data

US 2013/0259224 A1    Oct. 3, 2013

(30) Foreign Application Priority Data

Apr. 2, 2012    (KR) ........................ 10-2012-0033797

(51) Int. Cl.
*H04L 9/00*    (2006.01)
*H04L 9/28*    (2006.01)
*G06F 7/76*    (2006.01)
*G06F 7/58*    (2006.01)
*H04L 9/06*    (2006.01)

(52) U.S. Cl.
CPC *G06F 7/582* (2013.01); *H04L 9/28* (2013.01); *G06F 7/766* (2013.01); *H04L 2209/08* (2013.01); *H04L 2209/24* (2013.01); *H04L 9/0631* (2013.01)

USPC .............................................. 380/28; 380/46

(58) Field of Classification Search
CPC ....... H04L 9/06; H04L 9/0618; H04L 9/0625; H04L 9/0631; H04L 9/0643; H04L 9/0656; H04L 9/0662; H04L 9/0668; H04L 9/0675; H04L 9/0681; H04L 2209/24; G06F 7/582
USPC ......... 380/44–47, 28; 713/189; 708/250, 252, 708/255

See application file for complete search history.

(56) References Cited

U.S. PATENT DOCUMENTS

| 7,209,556 | B2 * | 4/2007 | Ohkuma et al. ............... 380/37 |
| 7,305,085 | B2 * | 12/2007 | Ohkuma et al. ............... 380/42 |
| 7,570,700 | B2 * | 8/2009 | Cameron et al. .............. 375/265 |
| 7,949,128 | B2 * | 5/2011 | Bunimov et al. ............... 380/28 |
| 2009/0110197 | A1 | 4/2009 | Michaels |
| 2010/0034385 | A1 | 2/2010 | Gantman et al. |

FOREIGN PATENT DOCUMENTS

KR    10-2007-0085244 A    8/2007

* cited by examiner

*Primary Examiner* — Hosuk Song
(74) *Attorney, Agent, or Firm* — Sughrue Mion, PLLC

(57) ABSTRACT

Generating a random permutation by arranging a sequence N numbers in a matrix, performing random arrangement operations on the rows of the matrix to generate an intermediary matrix, performing random arrangement operations on the columns of the intermediary matrix to generate a second intermediary matrix, and arranging the N numbers of the second intermediary matrix as a rearranged sequence of the N numbers.

24 Claims, 33 Drawing Sheets

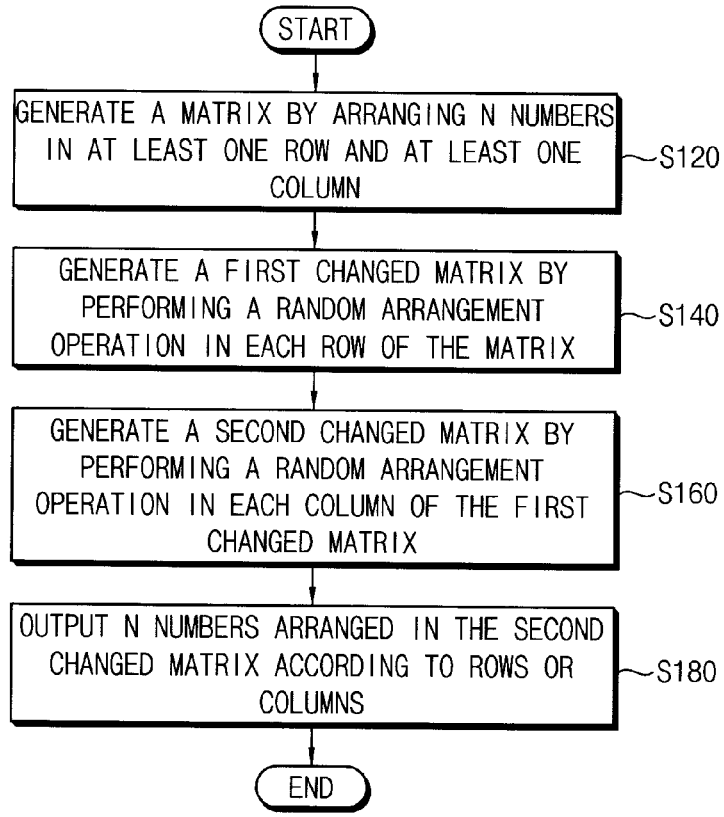
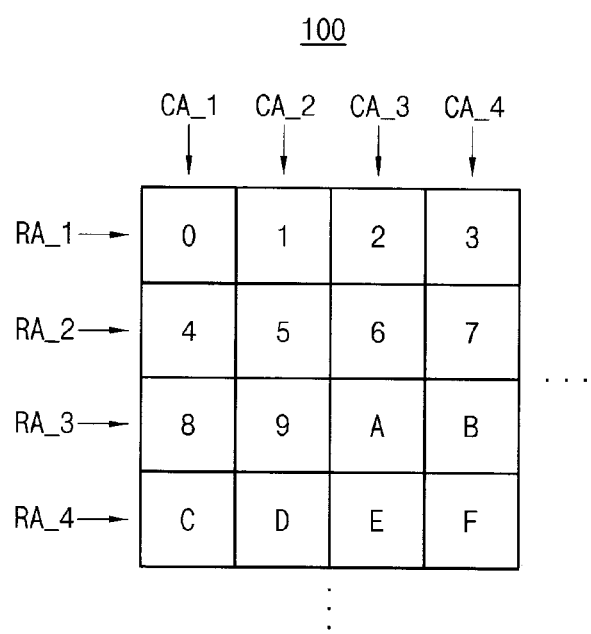

| | | | | |
|---|---|---|---|---|
| ROT_1 ⇒ | 0 | 1 | 2 | 3 |
| ROT_2 ⇒ | 4 | 5 | 6 | 7 |
| ROT_3 ⇒ | 8 | 9 | A | B |
| ROT_4 ⇒ | C | D | E | F |

| | | | | |
|---|---|---|---|---|
| < RRN=1 > | 3 | 0 | 1 | 2 |
| < RRN=2 > | 6 | 7 | 4 | 5 |
| < RRN=3 > | 9 | A | B | 8 |
| < RRN=0 > | C | D | E | F |

| 3 | 0 | 1 | 2 |
|---|---|---|---|
| 6 | 7 | 4 | 5 |
| 9 | A | B | 8 |
| C | D | E | F |

⇧ ⇧ ⇧ ⇧
ROT_1  ROT_2  ROT_3  ROT_4

| C | A | 4 | 2 |
|---|---|---|---|
| 3 | D | B | 5 |
| 6 | 0 | E | 8 |
| 9 | 7 | 1 | F |

<CRN=1>  <CRN=3>
   <CRN=2>  <CRN=0>

| | | | |
|---|---|---|---|
| ROT_1 ⇒ | 0 | 1 | 2 |
| ROT_2 ⇒ | 3 | 4 | 5 |
| ROT_3 ⇒ | 6 | 7 | 8 |
| ROT_4 ⇒ | 9 | A | B |
| ROT_5 ⇒ | C | D | E |

| | | | |
|---|---|---|---|
| < RRN=1 > | 2 | 0 | 1 |
| < RRN=1 > | 5 | 3 | 4 |
| < RRN=0 > | 6 | 7 | 8 |
| < RRN=1 > | B | 9 | A |
| < RRN=1 > | E | C | D |

140b

| 2 | 0 | 1 | 3 |
|---|---|---|---|
| 6 | 4 | 5 | 7 |
| B | A | 9 | 8 |
| C | D | E | F |

↑    ↑    ↑    ↑
SUFF_1 SUFF_2 SUFF_3 SUFF_4

| B | 0 | 5 | 3 |
|---|---|---|---|
| 2 | D | 9 | 7 |
| 6 | A | E | 8 |
| C | 4 | 1 | F |

220a

| | | | | |
|---|---|---|---|---|
| RA_1 → | 0 | 1 | 2 | 3 |
| RA_2 → | 4 | 5 | 6 | 7 |
| RA_3 → | 8 | 9 | A | B |
| RA_4 → | C | D | E | F |

220b

| | | | |
|---|---|---|---|
| 3 | 0 | 1 | 2 |
| 6 | 7 | 4 | 5 |
| 9 | A | B | 8 |
| C | D | E | F |

TRANSPOSE

220c

| RA_1 → | 3 | 6 | 9 | C |
| RA_2 → | 0 | 7 | A | D |
| RA_3 → | 1 | 4 | B | E |
| RA_4 → | 2 | 5 | 8 | F |

220d

| C | 3 | 6 | 9 |
| A | D | 0 | 7 |
| 4 | B | E | 1 |
| 2 | 5 | 8 | F |

TRANSPOSE

220e

| C | A | 4 | 2 |
|---|---|---|---|
| 3 | D | B | 5 |
| 6 | 0 | E | 8 |
| 9 | 7 | 1 | F |

300

METHOD OF GENERATING A RANDOM PERMUTATION, RANDOM PERMUTATION GENERATING DEVICE, AND ENCRYPTION/DECRYPTION DEVICE HAVING THE SAME

CROSS-REFERENCE TO RELATED APPLICATION(S)

This application claims priority from Korean Patent Application No. 10-2012-0033797, filed on Apr. 2, 2012, in the Korean Intellectual Property Office (KIPO), the contents of which are incorporated herein by reference in its entirety.

BACKGROUND

1. Field

Methods and apparatuses consistent with the exemplary embodiments relate to random permutation generating techniques, and more particularly, to a method of generating a random permutation based on a binary random source, a random permutation generating device, and an encryption/decryption device having the random permutation generating device.

2. Description of the Related Art

Recently, due to increasing importance of data security, a security algorithm is applied to data used by an electronic device. Generally, since an execution of the security algorithm requires a random permutation, an encryption/decryption device needs to include a random permutation generating device that generates the random permutation based on a binary random source (i.e., a source having a binary form), where the random permutation generating device is implemented by hardware or software.

Conventional random permutation generating devices may generate the random permutation based on a conventional random permutation generating method, such as Fisher and Yates method, etc. However, it is difficult to implement the conventional random permutation generating method in hardware. In addition, if the conventional random permutation generating method is implemented by hardware, the hardware complexity may be high.

SUMMARY

Aspects of the exemplary embodiments provide a method of generating a random permutation capable of having low hardware complexity, and capable of efficiently using a binary random source when generating a random permutation based on the binary random source.

Aspects of the exemplary embodiments also provide a random permutation generating device capable of efficiently using a binary random source having low hardware complexity.

Aspects of the exemplary embodiments further provide an encryption/decryption device having the random permutation generating device.

According to an aspect of an exemplary embodiment, there is provided a method of generating a random permutation including a step of arranging a sequence of N numbers in a matrix, where N is an integer equal to or greater than 2, a step of generating a first changed matrix by performing a first random arrangement operation on the N numbers in each row of the matrix, the first random arrangement operation performed based on a row random number, a step of generating a second changed matrix by performing a second random arrangement operation on the N numbers in each column of the first changed matrix, the second random arrangement operation performed based on a column random number, and a step of outputting the N numbers arranged in the second changed matrix according to rows or columns of the second changed matrix as a rearranged sequence of the sequence of N numbers.

The N numbers may have a binary form.

The matrix maybe a square matrix or a rectangular matrix.

The step of generating the first changed matrix may include a step of rotating the N numbers arranged in each row of the matrix by the row random number in a row direction of the matrix.

The step of generating the second changed matrix may include a step of rotating the N numbers arranged in each column of the first changed matrix by the column random number in a column direction of the first changed matrix.

The row random number may be independently selected for each row of the matrix.

A range of the row random number may be between 0 and $2^{\lceil \log_2 j \rceil}-1$, where j is a quantity of the N numbers arranged in each row of the matrix.

The column random number may be independently selected for each column of the first changed matrix.

A range of the column random number may be between 0 and $2^{\lceil \log_2 k \rceil}-1$, where k is a quantity of the N numbers arranged in each column of the first changed matrix.

The step of generating the first changed matrix may include a step of generating a plurality of row sub-matrixes by arranging the N numbers of each row of the matrix in at least one row and at least one column of the plurality of row sub-matrixes, a step of generating a plurality of changed row sub-matrixes by performing a rotation operation on the N numbers in each row and each column of each of the plurality of row sub-matrixes, and a step of outputting the N numbers arranged in each of the plurality of changed row sub-matrixes as each row of the first changed matrix.

The step of generating the second changed matrix may include a step of generating a plurality of column sub-matrixes by arranging the N numbers of each column of the first changed matrix in at least one row and at least one column of the plurality of column sub-matrixes, a step of generating a plurality of changed column sub-matrixes by performing a rotation operation on the N numbers in each row and each column of each of the plurality of column sub-matrixes, and a step of outputting the N numbers arranged in each of the plurality of changed column sub-matrixes as each column of the second changed matrix.

According to an aspect of an exemplary embodiment, there is provided a method generating a random permutation including a step of arranging a sequence of N numbers in a matrix, where N is an integer equal to or greater than 2, a step of generating a first changed matrix by performing a first random arrangement operation on the N numbers in each row of the matrix, the first random arrangement operation performed based on a first row random number, a step of generating a second changed matrix corresponding to a transposed matrix of the first changed matrix, a step of generating a third changed matrix by performing a second random arrangement operation on the N numbers in each row of the second changed matrix, the second random arrangement operation performed based on a second row random number, a step of generating a fourth changed matrix corresponding to a transposed matrix of the third changed matrix, and a step of outputting the N numbers arranged in the fourth changed matrix according to rows or columns of the fourth changed matrix as a rearranged sequence of the sequence of N numbers.

The matrix may be a square matrix or a rectangular matrix.

The step of generating the first changed matrix may include a step of rotating the N numbers arranged in each row of the matrix by the first row random number in a row direction of the matrix.

The step of generating the third changed matrix may include a step of rotating the N numbers arranged in each row of the second changed matrix by the second row random number in the row direction of the second changed matrix.

The first row random number may be independently selected for each row of the matrix.

The second row random number may be independently selected for each row of the second changed matrix.

The step of generating the first changed matrix may include a step of generating a plurality of first sub-matrixes by arranging the N numbers of each row of the matrix in at least one row and at least one column of the plurality of first sub-matrixes, a step of generating a plurality of first changed sub-matrixes by performing a rotation operation on the N numbers in each row and each column of each of the plurality of first sub-matrixes, and a step of outputting the N numbers arranged in each of the plurality of first changed sub-matrixes as each row of the first changed matrix.

The step of generating the third changed matrix may include a step of generating a plurality of second sub-matrixes by arranging the N numbers of each row of the second changed matrix in at least one row and at least one column of the plurality of second sub-matrixes, a step of generating a plurality of second changed sub-matrixes by performing a rotation operation on the N numbers in each row and each column of each of the plurality of second sub-matrixes, and a step of outputting the N numbers arranged in each of the plurality of second changed sub-matrixes as each row of the third changed matrix.

According to an aspect of an exemplary embodiment, there is provided a random permutation generating device including a permutation input unit configured to receive an initial permutation sequence of N numbers, where N is an integer equal to or greater than 2 and configured to arrange the N numbers of the initial permutation sequence in a matrix; a first matrix change unit configured to generate a first changed matrix by performing a first random arrangement operation on the N numbers in each row of the matrix, the first random arrangement operation performed based on a row random number, a second matrix change unit configured to generate a second changed matrix by performing a second random arrangement operation on the N numbers in each column of the first changed matrix, the second random arrangement operation performed based on a column random number, and a permutation output unit configured to generate a final permutation sequence of the N numbers by outputting the N numbers arranged in the second changed matrix according to rows or columns of the second changed matrix as the final permutation sequence that is a rearranged sequence of the initial permutation sequence.

The first matrix change unit may rotate the N numbers arranged in each row of the matrix by the row random number in a row direction of the matrix, the row random number being independently selected for each row of the matrix.

The second matrix change unit may the N numbers arranged in each column of the first changed matrix by the column random number in a column direction of the first changed matrix, the column random number being independently selected for each column of the first changed matrix.

The first matrix change unit may generate a plurality of row sub-matrixes by arranging the N numbers of each row of the matrix in at least one row and at least one column of the plurality of row sub-matrixes, may generate a plurality of changed row sub-matrixes by performing a rotation operation on the N numbers in each row and each column of each of the plurality of row sub-matrixes, and may output the N numbers arranged in each of the plurality of changed row sub-matrixes as each row of the first changed matrix.

The second matrix change unit may generate a plurality of column sub-matrixes by arranging the N numbers of each column of the first changed matrix in at least one row and at least one column of the plurality of column sub-matrixes, may generate a plurality of changed column sub-matrixes by performing a rotation operation on the N numbers in each row and each column of each of the plurality of column sub-matrixes, and may output the N numbers arranged in each of the plurality of changed column sub-matrixes as each column of the second changed matrix.

According to an aspect of an exemplary embodiment, there is provided a random permutation generating device including a permutation input unit configured to receive an initial permutation sequence of N numbers, where N is an integer equal to or greater than 2, and configured to arrange the N numbers of the initial permutation sequence in a matrix, a first matrix change unit configured to generate a first changed matrix by performing a first random arrangement operation on the N numbers in each row of the matrix, the first random arrangement operation performed based on a first row random number, a first matrix transpose unit that generates a second changed matrix corresponding to a transposed matrix of the first changed matrix, a second matrix change unit configured to generate a third changed matrix by performing a second random arrangement operation on the N numbers in each row of the second changed matrix, the second random arrangement operation performed based on a second row random number, a second matrix transpose unit that generates a fourth changed matrix corresponding to a transposed matrix of the third changed matrix, and a permutation output unit configured to generate a final permutation sequence of the N numbers by outputting the N numbers arranged in the fourth changed matrix according to rows or columns of the fourth changed matrix as the final permutation sequence that is a rearranged sequence of the initial permutation sequence.

The first matrix change unit may rotate the N numbers arranged in each row of the matrix by the first row random number in a row direction of the matrix, the first row random number being independently selected for each row of the matrix.

The second matrix change unit may rotate the N numbers arranged in each row of the second changed matrix by the second row random number in the row direction of the second changed matrix, the second row random number being independently selected for each row of the second changed matrix.

The first matrix change unit may generate a plurality of first sub-matrixes by arranging the N numbers of each row of the matrix in at least one row and at least one column of the plurality of first sub-matrixes, may generate a plurality of first changed sub-matrixes by performing a rotation operation on the N numbers in each row and each column of each of the plurality of first sub-matrixes, and may output the N numbers arranged in each of the plurality of first changed sub-matrixes as each row of the first changed matrix.

The second matrix change unit may generate a plurality of second sub-matrixes by arranging the N numbers of each row of the second changed matrix in at least one row and at least one column of the plurality of second sub-matrixes, may generate a plurality of second changed sub-matrixes by performing a rotation operation on the N numbers in each row and each column of each of the plurality of second sub-matrixes, and may output the N numbers arranged in each of the plurality of second changed sub-matrixes as each row of the third changed matrix.

According to an aspect of an exemplary embodiment, there is provided an encryption/decryption device may include a key scheduling unit configured to generate a plurality of round keys based on an input key, the round keys for performing each of a plurality of encryption/decryption rounds, a block round unit configured to encrypt a plain text or decrypt an encrypted text by performing the plurality of encryption/decryption rounds based on the plurality of round keys, a random permutation generating unit configured to spatially randomize processing of key-sboxes in the key scheduling unit or processing of data-sboxes in the block round unit by performing a random arrangement operation on an initial permutation sequence of N numbers using a matrix to generate a final permutation sequence of the N numbers that is a rearranged sequence of the initial permutation sequence, and an advanced encryption standard (AES) controller unit configured to control the key scheduling unit, the block round unit, and the random permutation generating unit based on an AES algorithm.

The random permutation generating unit may temporally randomize the processing of the key-sboxes in the key scheduling unit or the processing of the data-sboxes in the block round unit.

The random permutation generating unit may include a permutation input unit configured to receive the initial permutation having the N numbers, where N is an integer equal to or greater than 2 configured to arrange the N numbers of the initial permutation sequence in the matrix; a first matrix change unit configured to generate a first changed matrix by performing a first random arrangement operation on the N numbers in each row of the predetermined matrix, the first random arrangement operation performed based on a row random number, a second matrix change unit configured to generate a second changed matrix by performing a second random arrangement operation on the N numbers in each column of the first changed matrix, the second random arrangement operation performed based on a column random number, and a permutation output unit configured to generate the final permutation sequence of the N numbers by outputting the N numbers arranged in the second changed matrix according to rows or columns of the second changed matrix as the final permutation sequence.

The random permutation generating unit may include a permutation input unit configured to receive the initial permutation sequence having the N numbers, where N is an integer equal to or greater than 2, and configured to arrange the N numbers of the initial permutation sequence in the matrix, a first matrix change unit configured to generate a first changed matrix by performing a first random arrangement operation on the N numbers in each row of the predetermined matrix, the first random arrangement operation performed based on a first row random number, a first matrix transpose unit that generates a second changed matrix corresponding to a transposed matrix of the first changed matrix, a second matrix change unit configured to generate a third changed matrix by performing a second random arrangement operation on the N numbers in each row of the second changed matrix, the second random arrangement operation performed based on a second row random number, a second matrix transpose unit that generates a fourth changed matrix corresponding to a transposed matrix of the third changed matrix, and a permutation output unit configured to generate the final permutation sequence of the N numbers by outputting the N numbers arranged in the fourth changed matrix according to rows or columns of the fourth changed matrix as the final permutation sequence.

Therefore, a method of generating a random permutation according to the exemplary embodiments may generate a random permutation by performing a random arrangement operation (i.e., a rotation operation or a shuffle operation) in each row and a random arrangement operation in each column on a matrix corresponding to an initial permutation. As a result, the method of generating a random permutation may be implemented by a simple structure of multiplexers when being implemented by hardware, and may efficiently use a binary random source that is applied to each row and each column of the matrix.

In addition, a random permutation generating device according to the exemplary embodiments may generate a random permutation by performing a random arrangement operation in each row and a random arrangement operation in each column on a matrix corresponding to an initial permutation. As a result, the random permutation generating device may be implemented by a simple structure of multiplexers, and may efficiently use a binary random source that is applied to each row and each column of the matrix.

Further, an encryption/decryption device according to the exemplary embodiments may spatially and/or temporally randomize processing of data-sboxes that is performed by a block round unit in each round and/or processing of key-sboxes that is performed by a key scheduling unit in each round. As a result, a high data security against an external attack, such as Side Channel Analysis (SCA), etc., may be achieved.

BRIEF DESCRIPTION OF THE DRAWINGS

Illustrative, non-limiting exemplary embodiments will be more clearly understood from the following detailed description taken in conjunction with the accompanying drawings, in which:

FIG. 1 is a flow chart illustrating a method of generating a random permutation according to an exemplary embodiment.

FIG. 2 is a diagram illustrating a square matrix that is used for a method of FIG. 1.

FIGS. 5 through 9 are diagrams illustrating an example in which a random permutation is generated by a rotation operation based on a square matrix in FIG. 4.

FIGS. 11 through 15 are diagrams illustrating an example in which a random permutation is generated by a rotation operation based on a rectangular matrix in FIG. 4.

FIGS. 18 through 23 are diagrams illustrating an example in which a random permutation is generated by a shuffle operation in FIG. 17.

DETAILED DESCRIPTION OF THE EXEMPLARY EMBODIMENTS

Figure 3:
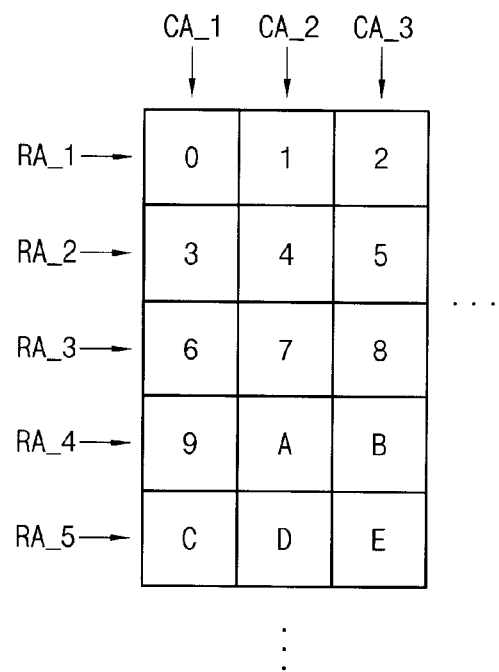
FIG. 3 is a diagram illustrating a rectangular matrix that is used for a method of FIG. 1.

Various exemplary embodiments will be described more fully hereinafter with reference to the accompanying drawings, in which some exemplary embodiments are shown. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, the element can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure relates. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of generating a random permutation according to an exemplary embodiment. FIG. 2 is a diagram illustrating a square matrix that is used for a method of FIG. 1. FIG. 3 is a diagram illustrating a rectangular matrix that is used for a method of FIG. 1.

Referring to FIGS. 1 through 3, the method of FIG. 1 may generate a matrix by arranging N numbers, where N is an integer equal to or greater than 2, in at least one row and at least one column (Step S120), generate a first changed matrix by performing a random arrangement operation, based on at least one random number, in each row of the matrix (Step S140), generate a second changed matrix by performing a random arrangement operation, based on at least one random number, in each column of the first changed matrix (Step S160), and output N numbers arranged in the second changed matrix according to rows or columns (Step S180). In the exemplary embodiment, a square matrix 100 or a rectangular matrix 200 may be selected as the matrix.

The method of FIG. 1 may generate the matrix (e.g., the square matrix 100 or the rectangular matrix 200) by arranging N numbers in at least one row and at least one column (Step S120). Here, N numbers may constitute an initial permutation. When N numbers are arranged in the square matrix 100 or the rectangular matrix 200, N numbers may be arranged in the square matrix 100 or the rectangular matrix 200 based on a sequence of the initial permutation, or N numbers may be arranged in the square matrix 100 or the rectangular matrix 200 regardless of a sequence of the initial permutation. For example, it is illustrated in FIG. 2 that 16 numbers of the initial permutation {0, 1, 2, 3, 4, 5, 6, 7, 8, 9, A, B, C, D, E, F} are arranged in the square matrix 100 based on a sequence of the initial permutation {0, 1, 2, 3, 4, 5, 6, 7, 8, 9, A, B, C, D, E, F}. In addition, it is illustrated in FIG. 3 that 15 numbers of the initial permutation {0, 1, 2, 3, 4, 5, 6, 7, 8, 9, A, B, C, D, E} are arranged in the rectangular matrix 200 based on a sequence of the initial permutation {0, 1, 2, 3, 4, 5, 6, 7, 8, 9, A, B, C, D, E}. As described above, however, an arrangement order of N numbers may be variously changed regardless of a sequence of an initial permutation. In the exemplary embodiment, N numbers may have a binary form, respectively. For example, assuming that the initial permutation is {00, 01, 10, 11}, N numbers may include '00', '01', '10', and '11'. In this case, the initial permutation {00, 01, 10, 11} may be randomized by a binary random source {0, 1}.

After the matrix is generated by arranging N numbers in at least one row and at least one column (Step S120), the method of FIG. 1 may generate the first changed matrix by performing a random arrangement operation in each row of the square matrix 100 or the rectangular matrix 200 (i.e., RA_1, RA_2, RA_3, RA_4, . . . ) (Step S140). In one exemplary embodiment, the random arrangement operation may correspond to a rotation operation. That is, the method of FIG. 1 may generate the first changed matrix by rotating numbers of each row of the square matrix 100 or the rectangular matrix 200 by a row random number in a row direction. Here, the row random number may be independently selected for each row of the matrix (i.e. the square matrix 100 or the rectangular matrix 200). For example, in case of the square matrix 100, numbers arranged in a first row may be rotated by 1, numbers arranged in a second row may be rotated by 2, numbers arranged in a third row may be rotated by 3, and numbers arranged in a fourth row may be rotated by 0 (i.e., 4). In one exemplary embodiment, a range of the row random number may be between 0 and $2^{\lceil \log_2 j \rceil}-1$, where j is the quantity of numbers arranged in each row of the matrix. For example, if the quantity of numbers arranged in each row of the matrix is 4, a range of the row random number may be between 0 and 3. In addition, if the quantity of numbers arranged in each row of the matrix is 10, a range of the row random number may be between 0 and 7. Thus, a range of the row random number may be optimized without any entropy waste or any randomness reduction when the quantity of numbers arranged in each row of the matrix is an integer of powers of 2.

In another exemplary embodiment, the random arrangement operation may correspond to a shuffle operation. That is, the method of FIG. 1 may generate row-sub matrixes by arranging numbers of each row of the matrix in at least one row and at least one column, may generate changed row-sub matrixes by performing a rotation operation in each row and each column of each of the row-sub matrixes, and may output numbers arranged in each of the changed row-sub matrixes as each row of the first changed matrix. For example, assuming that the matrix is the square matrix 100, the method of FIG. 1 may generate a 2×2 row-sub matrix by arranging numbers (i.e., 0, 1, 2, 3) of a first row of the matrix, may generate a 2×2 changed row-sub matrix by performing a rotation operation in each row and each column of the 2×2 row-sub matrix, and may output numbers arranged in the 2×2 changed row-sub matrix as a first row of the first changed matrix. In the same manner, a second row of the first changed matrix may be generated by performing a shuffle operation for numbers arranged in a second row (i.e., 4, 5, 6, 7) of the matrix, a third row of the first changed matrix may be generated by performing a shuffle operation for numbers arranged in a third row (i.e., 8, 9, A, B) of the matrix, and a fourth row of the first changed matrix may be generated by performing a shuffle operation for numbers arranged in a fourth row (i.e., C, D, E, F) of the matrix. As a result, the method of FIG. 1 may maximize uses of entropy by adding more randomness when a random permutation is generated.

After the first changed matrix is generated, the method of FIG. 1 may generate a second changed matrix by performing a random arrangement operation in each column of the first changed matrix (i.e., CA_1, CA_2, CA_3, CA_4, . . . ) (Step S160). In one exemplary embodiment, the random arrangement operation may correspond to a rotation operation. That is, the method of FIG. 1 may generate the second changed matrix by rotating numbers arranged in each column of the first changed matrix by a column random number in a column direction. Here, the column random number may be independently selected for each column of the first changed matrix. For example, in case of the square matrix 100, numbers arranged in a first column may be rotated by 1, numbers arranged in a second column may be rotated by 2, numbers arranged in a third column may be rotated by 3, and numbers arranged in a fourth column may be rotated by 0 (i.e., 4). In one exemplary embodiment, a range of the column random number may be between 0 and $2^{\lceil \log_2 k \rceil}-1$, where k is the number of numbers arranged in each column of the first changed matrix. For example, if the quantity of numbers arranged in each column of the first changed matrix is 4, a range of the column random number may be between 0 and 3. In addition, if the quantity of numbers arranged in each column of the first changed matrix is 10, a range of the column random number may be between 0 and 7. Thus, a range of the column random number may be optimized without any entropy waste or any randomness reduction when the quantity of numbers arranged in each column of the first changed matrix is an integer of powers of 2.

In another exemplary embodiment, the random arrangement operation may correspond to a shuffle operation. That is, the method of FIG. 1 may generate column-sub matrixes by arranging numbers of each column of the first changed matrix in at least one row and at least one column, may generate changed column-sub matrixes by performing a rotation operation in each row and each column of each of the column-sub matrixes, and may output numbers arranged in each of the changed column-sub matrixes as each column of a second changed matrix. For example, assuming that the first changed matrix is the square matrix 100, the method of FIG. 1 may generate a 2×2 column-sub matrix by arranging numbers (i.e., 0, 4, 8, C) of a first column of the first changed matrix, may generate a 2×2 changed column-sub matrix by performing a rotation operation in each row and each column of the 2×2 column-sub matrix, and may output numbers arranged in the 2×2 changed column-sub matrix as a first column of the second changed matrix. In the same manner, a second column of the second changed matrix may be generated by performing a shuffle operation for numbers arranged in a second column (i.e., 1, 5, 9, D) of the first changed matrix, a third column of the second changed matrix may be generated by performing a shuffle operation for numbers arranged in a third column (i.e., 2, 6, A, E) of the first changed matrix, and a fourth column of the second changed matrix may be generated by performing a shuffle operation for numbers arranged in a fourth column (i.e., 3, 7, B, F) of the first changed matrix. As a result, the method of FIG. 1 may maximize uses of entropy by adding more randomness when a random permutation is generated.

After the second changed matrix is generated, the method of FIG. 1 may output N numbers arranged in the second changed matrix according to rows or columns (Step S180). For example, assuming that the second changed matrix is the square matrix 100, a final permutation (i.e., a random permutation) may be {0, 1, 2, 3, 4, 5, 6, 7, 8, 9, A, B, C, D, E, F} when numbers arranged in the second changed matrix are output according to rows. Alternatively, a final permutation (i.e., a random permutation) may be {0, 4, 8, C, 1, 5, 9, D, 2, 6, A, E, 3, 7, B, F} when numbers arranged in the second changed matrix are output according to columns. Similarly, assuming that the second changed matrix is the rectangular matrix 200, a final permutation (i.e., a random permutation) may be {0, 1, 2, 3, 4, 5, 6, 7, 8, 9, A, B, C, D, E} when numbers arranged in the second changed matrix are output according to rows. Alternatively, a final permutation (i.e., a random permutation) may be {0, 3, 6, 9, C, 1, 4, 7, A, D, 2, 5, 8, B, E} when numbers arranged in the second changed matrix are output according to columns. As described above, the method of FIG. 1 may generate a random permutation by performing a random arrangement operation (i.e., a rotation operation or a shuffle operation) in each row and each column of a matrix corresponding to an initial permutation. Thus, the method of FIG. 1 may be implemented by a simple structure (i.e., hardware) in which a plurality of multiplexers are coupled using a plurality of wires. In addition, the method of FIG. 1 may efficiently use a binary random source, the binary random source being applied to each row and each column of the matrix, when the method of FIG. 1 generates a random permutation based on the binary random source.

Although it is described above that the first changed matrix is generated by performing a random arrangement operation in each row of the matrix, and then the second changed matrix is generated by performing a random arrangement operation in each column of the first changed matrix, the exemplary embodiment is not limited thereto. Thus, the first changed matrix may be generated by performing a random arrangement operation in each column of the matrix, and then the second change matrix may be generated by performing a random arrangement operation in each row of the first changed matrix. In addition, the method of FIG. 1 may reduce a size of the binary random source by repeatedly using the binary random source. For example, assuming that the matrix is the square matrix 100, the method of FIG. 1 may reduce a size of the binary random source that is applied to each row of the matrix by applying the same row random number to even rows of the matrix, and by applying the same row random number to odd rows of the matrix. Similarly, assuming that the matrix is the square matrix 100, the method of FIG. 1 may reduce a size of the binary random source that is applied to each column of the matrix by applying the same column random number to even columns of the matrix, and by applying the same column random number to odd columns of the matrix. As a result, the method of FIG. 1 may allow randomness and entropy-efficiency according to required conditions for generating a random permutation.

Figure 4:
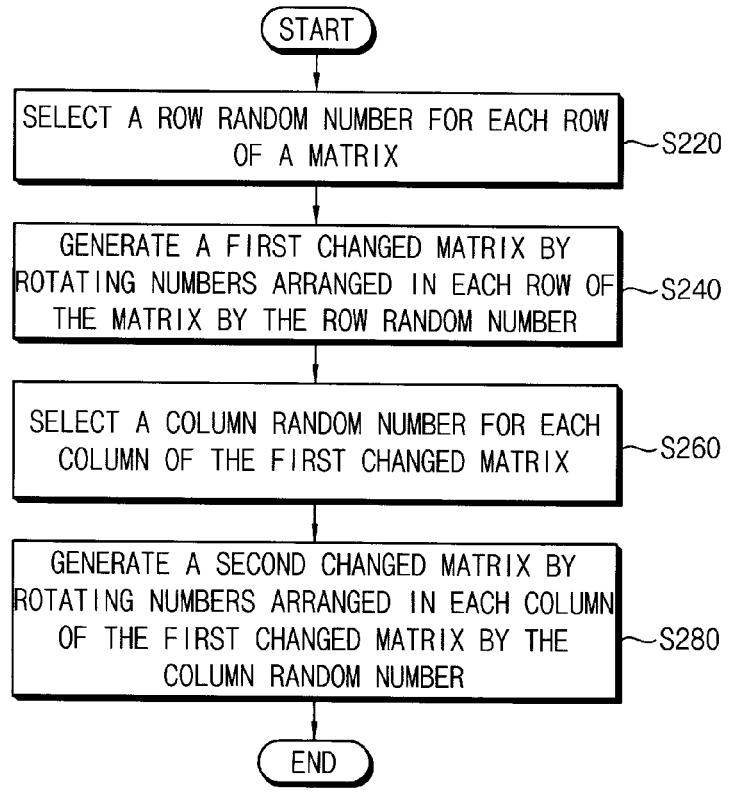
FIG. 4 is a flow chart illustrating an example in which a rotation operation is performed by a method of FIG. 1.

FIG. 4 is a flow chart illustrating an example in which a rotation operation is performed by a method of FIG. 1.

Referring to FIG. 4, the method of FIG. 1 may select a row random number for each row of a matrix (Step S220), the matrix being generated by arranging N numbers in at least one row and at least one column, and may generate a first changed matrix by rotating numbers arranged in each row of the matrix by the row random number in a row direction (Step S240). Subsequently, the method of FIG. 1 may select a column random number for each column of the first changed matrix (Step S260), and may generate a second changed matrix by rotating numbers arranged in each column of the first changed matrix by the column random number in a column direction (Step S280). As described above, the row random number may be independently selected for each row of the matrix, and the column random number may be independently selected for each column of the first change matrix. Here, a range of the row random number may be between 0 and $2^{\lceil \log_2 j \rceil}-1$, where j is the quantity of numbers arranged in each row of the matrix. In addition, a range of the column random number may be between 0 and $2^{\lceil \log_2 k \rceil}-1$, where k is the quantity of numbers arranged in each column of the first changed matrix.

For example, assuming that the quantity of numbers arranged in each row of a matrix is not an integer of powers of 2 (e.g., 10), a range of a row random number needs to be between 0 and 9 because a rotation result that is generated when the row random number is 0 is the same as a rotation result that is generated when the row random number is 10. Similarly, assuming that the quantity of numbers arranged in each column of a matrix is not an integer of powers of 2 (e.g., 10), a range of a column random number needs to be between 0 and 9 because a rotation result that is generated when the column random number is 0 is the same as a rotation result that is generated when the column random number is 10. However, in case of being implemented by the hardware that uses a binary random source, an entropy waste of the binary random source may be caused. That is, although the binary random source has 4 bits (i.e., between 0 and 15), a part of the binary random source (i.e., between 0 and 9) may be used. Thus, the method of FIG. 1 may determine a range of the row random number to be between 0 and $2^{\lceil \log_2 j \rceil}-1$, where j is the quantity of numbers arranged in each row of the matrix, and may determine a range of the column random number to be between 0 and $2^{\lceil \log_2 k \rceil}-1$, where k is the quantity of numbers arranged in each column of the first changed matrix. That is, the method of FIG. 1 may use a binary random source having 3 bits (i.e., between 0 and 7) but a binary random source having 4 bits (i.e., between 0 and 15). As a result, an entropy waste of the binary random source may be prevented.

Therefore, the method of FIG. 1 may not select 8 and 9 as the row random number and the column random number. As a result, randomness reduction may be caused when a rotation operation is performed in each row and each column of the matrix. However, since the method of FIG. 1 achieves sufficient randomness by performing a rotation operation in each row and each column of the matrix, the randomness reduction may be negligible. As described above, in case of implementing the hardware that uses a binary random source, a trade-off relation exists between randomness reduction and waste of the binary random source. Here, the method of FIG. 1 may select the row random number and the column random number while focusing on preventing waste of the binary random source. Hence, according to the method of FIG. 1, randomness reduction and waste of the binary random source may be prevented at the same time when the quantity of numbers arranged in each row of the matrix is an integer of powers of 2, and the quantity of numbers arranged in each column of the first changed matrix is an integer of powers of 2. In other words, a range of the row random number may be optimized when the quantity of numbers arranged in each row of the matrix is an integer of powers of 2, and a range of the column random number may also be optimized when the quantity of numbers arranged in each column of the first changed matrix is an integer of powers of 2.

FIGS. 5 through 9 are diagrams illustrating an example in which a random permutation is generated by a rotation operation based on a square matrix in FIG. 4.

Figure 5:
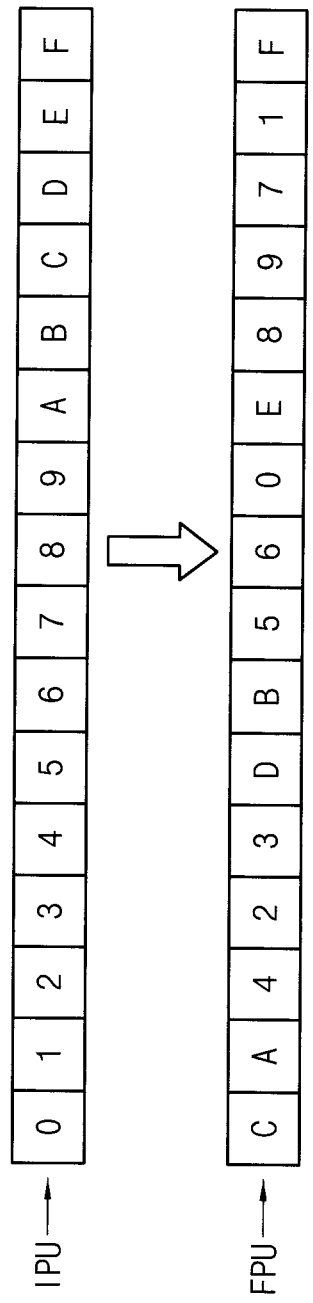

Referring to FIG. 5, the method of FIG. 1 may output a final permutation FPU (e.g., {C, A, 4, 2, 3, D, B, 5, 6, 0, E, 8, 9, 7, 1, F}) by performing a random arrangement operation on an initial permutation IPU (e.g., {0, 1, 2, 3, 4, 5, 6, 7, 8, 9, A, B, C, D, E, F}).

Referring to FIGS. 6 and 7, the method of FIG. 1 may generate a matrix 120*a* by arranging numbers (i.e., 0, 1, 2, 3, 4, 5, 6, 7, 8, 9, A, B, C, D, E, F) of the initial permutation IPU in 4 rows and 4 columns. Although it is illustrated in FIG. 6 that the matrix 120*a* includes first through fourth rows (i.e., {0, 1, 2, 3}, {4, 5, 6, 7}, {8, 9, A, B}, {C, D, E, F}) by arranging numbers of the initial permutation IPU based on a sequence of the initial permutation IPU, a sequence for arranging numbers of the initial permutation IPU is not limited thereto. That is, a sequence for arranging numbers of the initial permutation IPU may be variously determined regardless of a sequence of the initial permutation IPU. Then, the method of FIG. 1 may generate a first changed matrix 120*b* by performing a rotation operation (i.e., ROT_1, ROT_2, ROT_3, ROT_4) in each row of the matrix 120*a*. That is, a first rotation operation ROT_1 may be performed in the first row (i.e., {0, 1, 2, 3}) of the matrix 120*a*, a second rotation operation ROT_2 may be performed in the second row (i.e., {4, 5, 6, 7}) of the matrix 120*a*, a third rotation operation ROT_3 may be performed in the third row (i.e., {8, 9, A, B}) of the matrix 120*a*, and a fourth rotation operation ROT_4 may be performed in the fourth row (i.e., {C, D, E, F}) of the matrix 120*a*.

After a rotation operation (i.e., ROT_1, ROT_2, ROT_3, ROT_4) is performed in each row of the matrix 120*a*, the first changed matrix 120*b* may include first through fourth rows (i.e., {3, 0, 1, 2}, {6, 7, 4, 5}, {9, A, B, 8}, {C, D, E, F}). FIG. 7 shows an example of the first changed matrix 120*b* when the row random number for the first row of the matrix 120*a* is 1, the row random number for the second row of the matrix 120*a* is 2, the row random number for the third row of the matrix 120*a* is 3, and the row random number for the fourth row of the matrix 120*a* is 0. That is, the first changed matrix 120*b* may be generated by rotating numbers arranged in the first row of the matrix 120*a* by 1, by rotating numbers arranged in the second row of the matrix 120*a* by 2, by rotating numbers arranged in the third row of the matrix 120*a* by 3, and by rotating numbers arranged in the fourth row of the matrix 120*a* by 0. As described above, the row random number may be independently selected for each row of the matrix 120*a*. Here, a range of the row random number may be between 0 and $2^{\lceil \log_2 j \rceil}-1$, where j is the quantity of numbers arranged in each row of the matrix 120*a*. As illustrated in FIG. 7, since the quantity of numbers arranged in each row of the matrix 120*a* is 4, a range of the row random number may be between 0 and 3.

Referring to FIGS. 8 and 9, the method of FIG. 1 may generate a second changed matrix 120*c* by performing a rotation operation (i.e., ROT_1, ROT_2, ROT_3, ROT_4) in each column of the first changed matrix 120*b*. That is, a first rotation operation ROT_1 may be performed in a first column (i.e., {3, 6, 9, C}) of the first changed matrix 120*b*, a second rotation operation ROT_2 may be performed in a second column (i.e., {0, 7, A, D}) of the first changed matrix 120*b*, a third rotation operation ROT_3 may be performed in a third column (i.e., {1, 4, B, E}) of the first changed matrix 120*b*, and a fourth rotation operation ROT_4 may be performed in a fourth column (i.e., {2, 5, 8, F}) of the first changed matrix 120*b*. As a result, the second changed matrix 120*c* may include first through fourth columns (i.e., {C, 3, 6, 9}, {A, D, 0, 7}, {4, B, E, 1}, {2, 5, 8, F}). FIG. 9 shows an example of the second changed matrix 120*c* when the column random number for the first column of the first changed matrix 120*b* is 1, the column random number for the second column of the first changed matrix 120*b* is 2, the column random number for the third column of the first changed matrix 120*b* is 3, and the column random number for the fourth column of the first changed matrix 120*b* is 0. That is, the second changed matrix 120*c* may be generated by rotating numbers arranged in the first column of the first changed matrix 120*b* by 1, by rotating numbers arranged in the second column of the first changed matrix 120*b* by 2, by rotating numbers arranged in the third column of the first changed matrix 120*b* by 3, and by rotating numbers arranged in the fourth column of the first changed matrix 120*b* by 0. As described above, the column random number may be independently selected for each column of the first changed matrix 120*b*. Here, a range of the column random number may be between 0 and $2^{\lceil \log_2 k \rceil}-1$, where k is the quantity of numbers arranged in each column of the first changed matrix 120*b*. As illustrated in FIG. 9, since the quantity of numbers arranged in each column of the first changed matrix 120*b* is 4, a range of the column random number may be between 0 and 3.

Subsequently, the method of FIG. 1 may output numbers arranged in the second changed matrix 120*c* according to rows or columns. It is illustrated in FIG. 5 that numbers arranged in the second changed matrix 120*c* are sequentially output according to rows. That is, the final permutation FPU (i.e., {C, A, 4, 2, 3, D, B, 5, 6, 0, E, 8, 9, 7, 1, F}) may be generated by sequentially outputting the first row (i.e., {C, A, 4, 2}) of the second changed matrix 120*c*, the second row (i.e., {3, D, B, 5}) of the second changed matrix 120*c*, the third row (i.e., {6, 0, E, 8}) of the second changed matrix 120*c*, and the fourth row (i.e., {9, 7, 1, F}) of the second changed matrix 120*c*. However, the exemplary embodiment is not limited thereto. For example, numbers arranged in the second changed matrix 120*c* may be sequentially output according to columns. As described above, the method of FIG. 1 may be implemented by a simple structure (i.e., hardware) in which a plurality of multiplexers are coupled using a plurality of wires because the method of FIG. 1 generates a random permutation by performing a rotation operation in each row and each column of the matrix 120*a* corresponding to the initial permutation IPU. In addition, the method of FIG. 1 may efficiently use a binary random source, the binary random source being applied to each row and each column of the matrix 120*a*, when the method of FIG. 1 generates a random permutation based on the binary random source. Hereinafter, an example of hardware by which the method of FIG. 1 is implemented will be described in detail.

Figure 10:
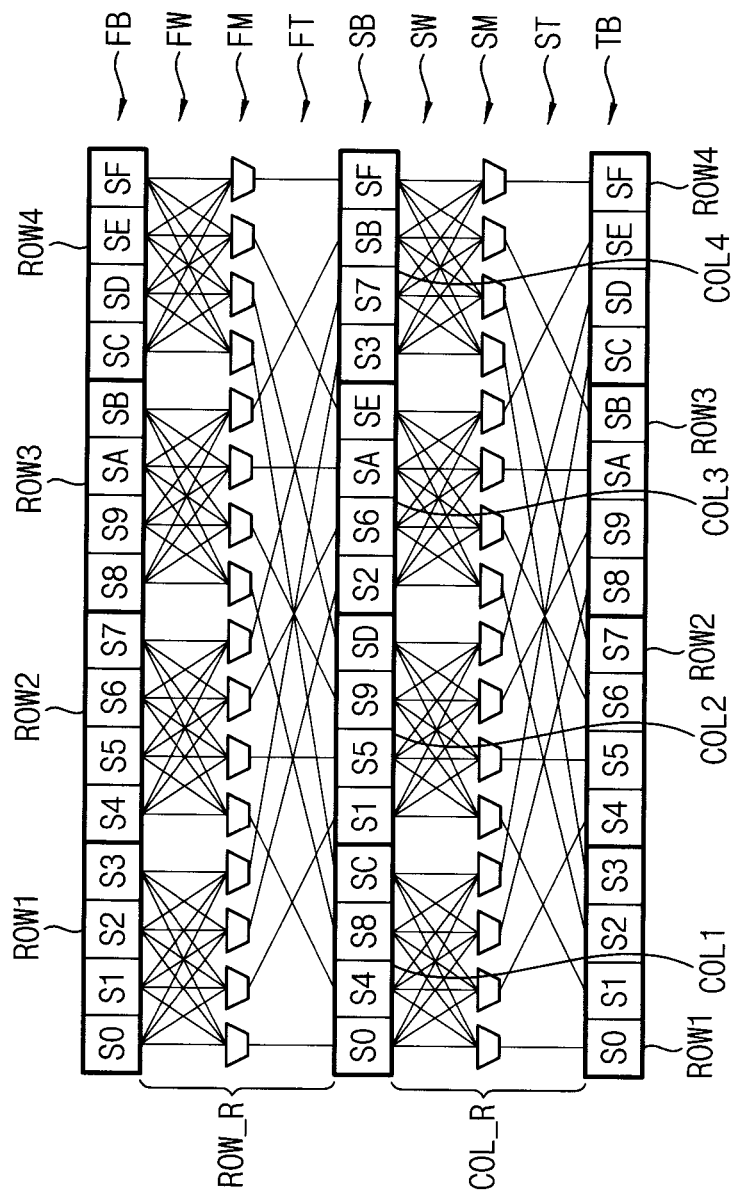
FIG. 10 is a circuit diagram illustrating an example in which a random permutation is generated by a rotation operation based on a square matrix in FIG. 4.

FIG. 10 is a circuit diagram illustrating an example in which a random permutation is generated by a rotation operation based on a square matrix in FIG. 4.

Referring to FIG. 10, a simple structure may be implemented by hardware for applying the method of FIG. 1 to generate a random permutation by performing a rotation operation based on a square matrix. In detail, the hardware may include a first buffer unit FB, a first wire unit FW, a first multiplexer unit FM, a first transpose wire unit FT, a second buffer unit SB, a second wire unit SW, a second multiplexer unit SM, a second transpose wire unit ST, and a third buffer unit TB.

The first buffer unit FB may correspond to a 4×4 matrix. The first buffer unit FB may receive an initial permutation including 16 numbers from outside, and may arrange 16 numbers of the initial permutation in 4 rows and 4 columns. For example, the first buffer unit FB may be implemented using a memory device for temporarily storing 16 numbers of the initial permutation, a buffer device, a delay device, etc. In one exemplary embodiment, the first buffer unit FB may arrange 16 numbers of the initial permutation based on a sequence of the initial permutation. In another exemplary embodiment, the first buffer unit FB may randomly arrange 16 numbers of the initial permutation (i.e., regardless of a sequence of the initial permutation). As illustrated in FIG. 10, the first buffer unit FB may have first through fourth rows ROW1 through ROW4, each of the first through fourth rows ROW1 through ROW4 including 4 numbers. Thus, first numbers of the first through fourth rows ROW1 through ROW4 may constitute a first column of the 4×4 matrix, second numbers of the first through fourth rows ROW1 through ROW4 may constitute a second column of the 4×4 matrix, third numbers of the first through fourth rows ROW1 through ROW4 may constitute a third column of the 4×4 matrix, and fourth numbers of the first through fourth rows ROW1 through ROW4 may constitute a fourth column of the 4×4 matrix. The first wire unit FW may couple the first buffer unit FB to the first multiplexer unit FM. Here, the first wire unit FW may couple the first buffer unit FB to the first multiplexer unit FM according to rows (i.e., ROW1, ROW2, ROW3, ROW4) of the 4×4 matrix.

The first multiplexer unit FM may include 16 multiplexers. Here, one group of the first multiplexer unit FM may include 4 multiplexers. That is, the first row ROW1 of the first buffer unit FB may be coupled to a first group of the first multiplexer unit FM, the second row ROW2 of the first buffer unit FB may be coupled to a second group of the first multiplexer unit FM, the third row ROW3 of the first buffer unit FB may be coupled to a third group of the first multiplexer unit FM, and the fourth row ROW4 of the first buffer unit FB may be coupled to a fourth group of the first multiplexer unit FM. Here, a row random number applied to the first buffer unit FB may be independently selected for each row of the first buffer unit FB (i.e., ROW1, ROW2, ROW3, ROW4). In addition, since 4 numbers of each row (i.e., ROW1, ROW2, ROW3, ROW4) of the first buffer unit FB are rotated by the same row random number, 4 multiplexers of each group of the first multiplexer unit FM may receive the same selection signal (i.e. a binary random source). The first transpose wire unit FT may couple the first multiplexer unit FM to the second buffer unit SB. Here, the first transpose wire unit FT may distribute 4 multiplexers of each group of the first multiplexer unit FM to first through fourth columns COL1 through COL4 of the second buffer unit SB. That is, the first transpose wire unit FT may prepare a rotation operation for each column (i.e., COL1, COL2, COL3, COL4) of the 4×4 matrix. Thus, a rotation operation ROW_R may be performed in each row (i.e., ROW1, ROW2, ROW3, ROW4) of the 4×4 matrix by the first buffer unit FB, the first wire unit FW, the first multiplexer unit FM, and the first transpose wire unit FT.

The second buffer unit SB may also be implemented using a memory device for temporarily storing 16 numbers, a buffer device, a delay device, etc. As illustrated in FIG. 10, the second buffer unit SB may have the first through fourth columns COL1 through COL4, each of the first through fourth columns COL1 through COL4 including 4 numbers. Thus, first numbers of the first through fourth columns COL1 through COL4 may constitute a first row of the 4×4 matrix, second numbers of the first through fourth columns COL1 through COL4 may constitute a second row of the 4×4 matrix, third numbers of the first through fourth columns COL1 through COL4 may constitute a third row of the 4×4 matrix, and fourth numbers of the first through fourth columns COL1 through COL4 may constitute a fourth row of the 4×4 matrix. The second wire unit SW may couple the second buffer unit SB to the second multiplexer unit SM. Here, the second wire unit SW may couple the second buffer unit SB to the second multiplexer unit SM according to columns (i.e., COL1, COL2, COL3, COL4) of the 4×4 matrix.

The second multiplexer unit SM may include 16 multiplexers. Here, one group of the second multiplexer unit SM may include 4 multiplexers. That is, the first column COL1 of the second buffer unit SB may be coupled to a first group of the second multiplexer unit SM, the second column COL2 of the second buffer unit SB may be coupled to a second group of the second multiplexer unit SM, the third column COL3 of the second buffer unit SB may be coupled to a third group of the second multiplexer unit SM, and the fourth column COL4 of the second buffer unit SB may be coupled to a fourth group of the second multiplexer unit SM. Here, a column random number applied to the second buffer unit SB may be independently selected for each column of the second buffer unit SB (i.e., COL1, COL2, COL3, COL4). In addition, since 4 numbers of each column (i.e., COL1, COL2, COL3, COL4) of the second buffer unit SB are rotated by the same column random number, 4 multiplexers of each group of the second multiplexer unit SM may receive the same selection signal (i.e. a binary random source). The second transpose wire unit ST may couple the second multiplexer unit SM to the third buffer unit TB. Here, the second transpose wire unit ST may distribute 4 multiplexers of each group of the second multiplexer unit SM to first through fourth rows ROW1 through ROW4 of the third buffer unit TB. Thus, a rotation operation COL_R may be performed in each column (i.e., COL1, COL2, COL3, COL4) of the 4×4 matrix by the second buffer unit SB, the second wire unit SW, the second multiplexer unit SM, and the second transpose wire unit ST.

Subsequently, the hardware may output numbers arranged in the third buffer unit TB according to rows. For example, the hardware may output a final permutation (i.e., a random permutation) by sequentially outputting the first through fourth rows ROW1 through ROW4 of the third buffer unit TB. Alternatively, the hardware may output the final permutation by randomly outputting the first through fourth rows ROW1 through ROW4 of the third buffer unit TB. In addition, the hardware may output numbers arranged in the third buffer unit TB according to columns. Thus, the method of FIG. 1 may be implemented by a simple structure having multiplexers and wires when being implemented by hardware. Although it is described above that a random permutation is generated by performing a rotation operation in each row of the 4×4 matrix, and then by performing a rotation operation in each column of the 4×4 matrix, the present inventive concept is not limited thereto. Therefore, it should be understood that a random permutation can be generated by performing a rotation operation in each column of the 4×4 matrix, and then by performing a rotation operation in each row of the 4×4 matrix.

FIGS. 11 through 15 are diagrams illustrating an example in which a random permutation is generated by a rotation operation based on a rectangular matrix in FIG. 4.

Figure 11:
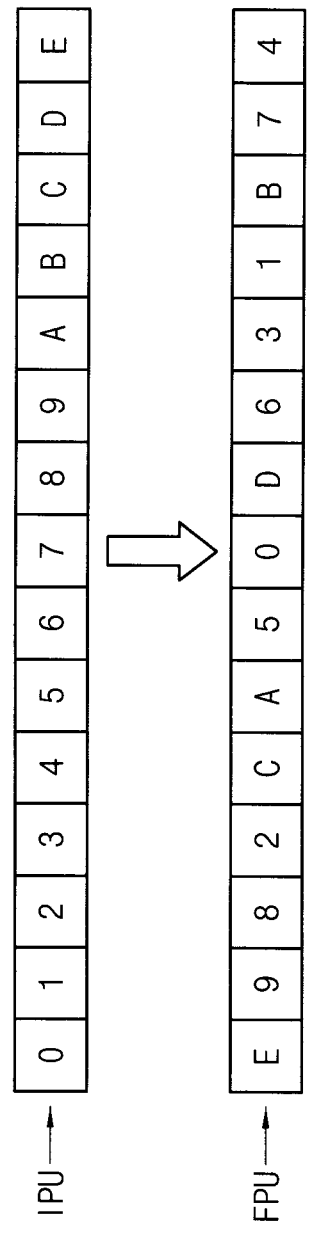

Referring to FIG. 11, the method of FIG. 1 may output a final permutation FPU (e.g., {E, 9, 8, 2, C, A, 5, 0, D, 6, 3, 1, B, 7, 4}) by performing a random arrangement operation on an initial permutation IPU (e.g., {0, 1, 2, 3, 4, 5, 6, 7, 8, 9, A, B, C, D, E}).

Referring to FIGS. 12 and 13, the method of FIG. 1 may generate a matrix 220a by arranging numbers (i.e., 0, 1, 2, 3, 4, 5, 6, 7, 8, 9, A, B, C, D, E) of the initial permutation IPU in 5 rows and 3 columns. Although it is illustrated in FIG. 12 that the matrix 220a includes first through fifth rows (i.e., {0, 1, 2}, {3, 4, 5}, {6, 7, 8}, {9, A, B}, {C, D, E}) by arranging numbers of the initial permutation IPU based on a sequence of the initial permutation IPU, a sequence for arranging numbers of the initial permutation IPU is not limited thereto. That is, a sequence for arranging numbers of the initial permutation IPU may be variously determined regardless of a sequence of the initial permutation IPU. Then, the method of FIG. 1 may generate a first changed matrix 220b by performing a rotation operation (i.e., ROT_1, ROT_2, ROT_3, ROT_4, ROT_5) in each row of the matrix 220a. That is, a first rotation operation ROT_1 may be performed in the first row (i.e., {0, 1, 2}) of the matrix 220a, a second rotation operation ROT_2 may be performed in the second row (i.e., {3, 4, 5}) of the matrix 220a, a third rotation operation ROT_3 may be performed in the third row (i.e., {6, 7, 8}) of the matrix 220a, a fourth rotation operation ROT_4 may be performed in the fourth row (i.e., {9, A, B}) of the matrix 220a, and a fifth rotation operation ROT_5 may be performed in the fifth row (i.e., {C, D, E}) of the matrix 220a.

After a rotation operation (i.e., ROT_1, ROT_2, ROT_3, ROT_4, ROT_5) is performed in each row of the matrix 220a, the first changed matrix 220b may include first through fifth rows (i.e., {2, 0, 1}, {5, 3, 4}, {6, 7, 8}, {B, 9, A}, {E, C, D}). FIG. 13 shows an example of the first changed matrix 220b when the row random number for the first row of the matrix 220a is 1, the row random number for the second row of the matrix 220a is 1, the row random number for the third row of the matrix 220a is 0, the row random number for the fourth row of the matrix 220a is 1, and the row random number for the fifth row of the matrix 220a is 1. That is, the first changed matrix 220b may be generated by rotating numbers arranged in the first row of the matrix 220a by 1, by rotating numbers arranged in the second row of the matrix 220a by 1, by rotating numbers arranged in the third row of the matrix 220a by 0, by rotating numbers arranged in the fourth row of the matrix 220a by 1, and by rotating numbers arranged in the fifth row of the matrix 220a by 1. As described above, the row random number may be independently selected for each row of the matrix 220a. Here, a range of the row random number may be between 0 and $2^{\lceil \log_2 j \rceil}-1$, where j is the quantity of numbers arranged in each row of the matrix 220a. As illustrated in FIG. 13, since the quantity of numbers arranged in each row of the matrix 220a is 3, a range of the row random number may be between 0 and 1.

Figure 14:
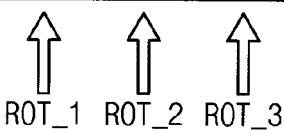

Referring to FIGS. 14 and 15, the method of FIG. 1 may generate a second changed matrix 220c by performing a rotation operation (i.e., ROT_1, ROT_2, ROT_3) in each column of the first changed matrix 220b. That is, a first rotation operation ROT_1 may be performed in a first column (i.e., {2, 5, 6, B, E}) of the first changed matrix 220b, a second rotation operation ROT_2 may be performed in a second column (i.e., {0, 3, 7, 9, C}) of the first changed matrix 220b, and a third rotation operation ROT_3 may be performed in a third column (i.e., {1, 4, 8, A, D}) of the first changed matrix 220b. As a result, the second changed matrix 220c may include first through third columns (i.e., {E, 2, 5, 6, B}, {9, C, 0, 3, 7}, {8, A, D, 1, 4}). FIG. 15 shows an example of the second changed matrix 220c when the column random number for the first column of the first changed matrix 220b is 1, the column random number for the second column of the first changed matrix 220b is 2, and the column random number for the third column of the first changed matrix 220b is 3. That is, the second changed matrix 220c may be generated by rotating numbers arranged in the first column of the first changed matrix 220b by 1, by rotating numbers arranged in the second column of the first changed matrix 220b by 2, and by rotating numbers arranged in the third column of the first changed matrix 220b by 3. As described above, the column random number may be independently selected for each column of the first changed matrix 220b. Here, a range of the column random number may be between 0 and $2^{\lceil \log_2 k \rceil}-1$, where k is the quantity of numbers arranged in each column of the first changed matrix 220b. As illustrated in FIG. 15, since the quantity of numbers arranged in each column of the first changed matrix 220b is 5, a range of the column random number may be between 0 and 3.

Subsequently, the method of FIG. 1 may output numbers arranged in the second changed matrix 220c according to rows or columns. It is illustrated in FIG. 11 that numbers arranged in the second changed matrix 220c are sequentially output according to rows. That is, the final permutation FPU (i.e., {E, 9, 8, 2, C, A, 5, 0, D, 6, 3, 1, B, 7, 4}) may be generated by sequentially outputting the first row (i.e., {E, 9, 8}) of the second changed matrix 220c, the second row (i.e., {2, C, A}) of the second changed matrix 220c, the third row (i.e., {5, 0, D}) of the second changed matrix 220c, the fourth row (i.e., {6, 3, 1}) of the second changed matrix 220c, and the fifth row (i.e., {B, 7, 4}) of the second changed matrix 220c. However, the present exemplary embodiment is not limited thereto. For example, numbers arranged in the second changed matrix 220c may be sequentially output according to columns. Thus, the method of FIG. 1 may be implemented by a simple structure (i.e., hardware) in which a plurality of multiplexers are coupled using a plurality of wires because the method of FIG. 1 generates a random permutation by performing a rotation operation in each row and each column of the matrix 220a corresponding to the initial permutation IPU. In addition, the method of FIG. 1 may efficiently use a binary random source, the binary random source being applied to each row and each column of the matrix 220a, when the method of FIG. 1 generates a random permutation based on the binary random source. Hereinafter, an example of hardware by which the method of FIG. 1 is implemented will be described in detail.

Figure 16:
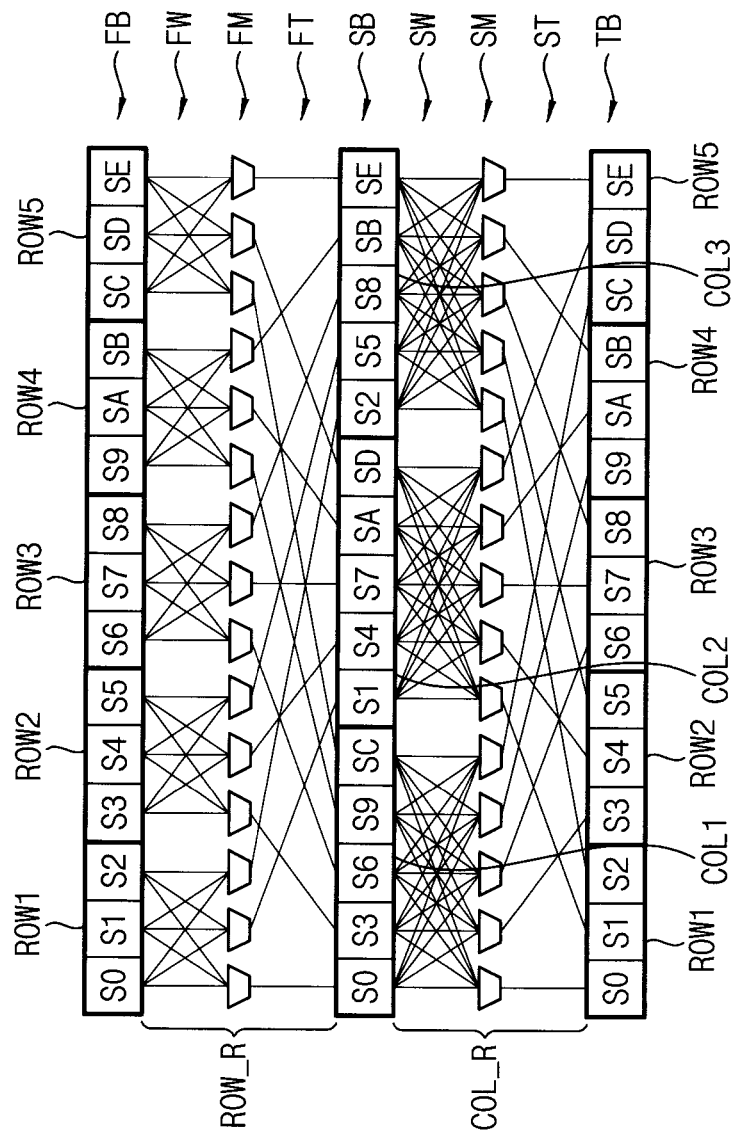
FIG. 16 is a circuit diagram illustrating an example in which a random permutation is generated by a rotation operation based on a rectangular matrix in FIG. 4.

FIG. 16 is a circuit diagram illustrating an example in which a random permutation is generated by a rotation operation based on a rectangular matrix in FIG. 4.

Referring to FIG. 16, it may be implemented by hardware (i.e., a simple structure) that the method of FIG. 1 generates a random permutation by performing a rotation operation based on a rectangular matrix. In detail, the hardware may include a first buffer unit FB, a first wire unit FW, a first multiplexer unit FM, a first transpose wire unit FT, a second buffer unit SB, a second wire unit SW, a second multiplexer unit SM, a second transpose wire unit ST, and a third buffer unit TB.

The first buffer unit FB may correspond to a 5×3 matrix. The first buffer unit FB may receive an initial permutation including 15 numbers, and may arrange 15 numbers of the initial permutation in 5 rows and 3 columns. For example, the first buffer unit FB may be implemented using a memory device for temporarily storing 15 numbers of the initial permutation, a buffer device, a delay device, etc. In one exemplary embodiment, the first buffer unit FB may arrange 15 numbers of the initial permutation based on a sequence of the initial permutation. In another exemplary embodiment, the first buffer unit FB may randomly arrange 15 numbers of the initial permutation (i.e., regardless of a sequence of the initial permutation). As illustrated in FIG. 16, the first buffer unit FB may have first through five rows ROW1 through ROW5, each of the first through five rows ROW1 through ROW5 including 3 numbers. Thus, first numbers of the first through five rows ROW1 through ROW5 may constitute a first column of the 5×3 matrix, second numbers of the first through five rows ROW1 through ROW5 may constitute a second column of the 5×3 matrix, and third numbers of the first through five rows ROW1 through ROW5 may constitute a third column of the 5×3 matrix. The first wire unit FW may couple the first buffer unit FB to the first multiplexer unit FM. Here, the first wire unit FW may couple the first buffer unit FB to the first multiplexer unit FM according to rows (i.e., ROW1, ROW2, ROW3, ROW4, ROW5) of the 5×3 matrix.

The first multiplexer unit FM may include 15 multiplexers. Here, one group of the first multiplexer unit FM may include 3 multiplexers. That is, the first row ROW1 of the first buffer unit FB may be coupled to a first group of the first multiplexer unit FM, the second row ROW2 of the first buffer unit FB may be coupled to a second group of the first multiplexer unit FM, the third row ROW3 of the first buffer unit FB may be coupled to a third group of the first multiplexer unit FM, the fourth row ROW4 of the first buffer unit FB may be coupled to a fourth group of the first multiplexer unit FM, and the fifth row ROW5 of the first buffer unit FB may be coupled to a fifth group of the first multiplexer unit FM. Here, a row random number applied to the first buffer unit FB may be independently selected for each row of the first buffer unit FB (i.e., ROW1, ROW2, ROW3, ROW4, ROW5). In addition, since 3 numbers of each row (i.e., ROW1, ROW2, ROW3, ROW4, ROW5) of the first buffer unit FB are rotated by the same row random number, 3 multiplexers of each group of the first multiplexer unit FM may receive the same selection signal (i.e. a binary random source). The first transpose wire unit FT may couple the first multiplexer unit FM to the second buffer unit SB. Here, the first transpose wire unit FT may distribute 3 multiplexers of each group of the first multiplexer unit FM to first through third columns COL1 through COL3 of the second buffer unit SB. That is, the first transpose wire unit FT may prepare a rotation operation for each column (i.e., COL1, COL2, COL3) of the 5×3 matrix. Thus, a rotation operation ROW_R may be performed in each row (i.e., ROW1, ROW2, ROW3, ROW4, ROW5) of the 5×3 matrix by the first buffer unit FB, the first wire unit FW, the first multiplexer unit FM, and the first transpose wire unit FT.

The second buffer unit SB may also be implemented using a memory device for temporarily storing 15 numbers, a buffer device, a delay device, etc. As illustrated in FIG. 16, the second buffer unit SB may have the first through third columns COL1 through COL3, each of the first through third columns COL1 through COL3 including 5 numbers. Thus, first numbers of the first through third columns COL1 through COL3 may constitute a first row of the 5×3 matrix, second numbers of the first through third columns COL1 through COL3 may constitute a second row of the 5×3 matrix, third numbers of the first through third columns COL1 through COL3 may constitute a third row of the 5×3 matrix, fourth numbers of the first through third columns COL1 through COL3 may constitute a fourth row of the 5×3 matrix, and fifth numbers of the first through third columns COL1 through COL3 may constitute a fifth row of the 5×3 matrix. The second wire unit SW may couple the second buffer unit SB to the second multiplexer unit SM. Here, the second wire unit SW may couple the second buffer unit SB to the second multiplexer unit SM according to columns (i.e., COL1, COL2, COL3) of the 5×3 matrix.

The second multiplexer unit SM may include 15 multiplexers. Here, one group of the second multiplexer unit SM may include 5 multiplexers. That is, the first column COL1 of the second buffer unit SB may be coupled to a first group of the second multiplexer unit SM, the second column COL2 of the second buffer unit SB may be coupled to a second group of the second multiplexer unit SM, and the third column COL3 of the second buffer unit SB may be coupled to a third group of the second multiplexer unit SM. Here, a column random number applied to the second buffer unit SB may be independently selected for each column of the second buffer unit SB (i.e., COL1, COL2, COL3). In addition, since 5 numbers of each column (i.e., COL1, COL2, COL3) of the second buffer unit SB are rotated by the same column random number, 5 multiplexers of each group of the second multiplexer unit SM may receive the same selection signal (i.e. a binary random source). The second transpose wire unit ST may couple the second multiplexer unit SM to the third buffer unit TB. Here, the second transpose wire unit ST may distribute 5 multiplexers of each group of the second multiplexer unit SM to first through fifth rows ROW1 through ROW5 of the third buffer unit TB. Thus, a rotation operation COL_R may be performed in each column (i.e., COL1, COL2, COL3) of the 5×3 matrix by the second buffer unit SB, the second wire unit SW, the second multiplexer unit SM, and the second transpose wire unit ST.

Subsequently, the hardware may output numbers arranged in the third buffer unit TB according to rows. For example, the hardware may output a final permutation (i.e., a random permutation) by sequentially outputting the first through fifth rows ROW1 through ROW5 of the third buffer unit TB. Alternatively, the hardware may output the final permutation by randomly outputting the first through fifth rows ROW1 through ROW5 of the third buffer unit TB. In addition, the hardware may output numbers arranged in the third buffer unit TB according to columns. Thus, the method of FIG. 1 may be implemented by a simple structure having multiplexers and wires when being implemented by hardware. Although it is described above that a random permutation is generated by performing a rotation operation in each row of the 5×3 matrix, and then by performing a rotation operation in each column of the 5×3 matrix, the present exemplary embodiment is not limited thereto. Therefore, it should be understood that a random permutation can be generated by performing a rotation operation in each column of the 5×3 matrix, and then by performing a rotation operation in each row of the 5×3 matrix.

Figure 17:
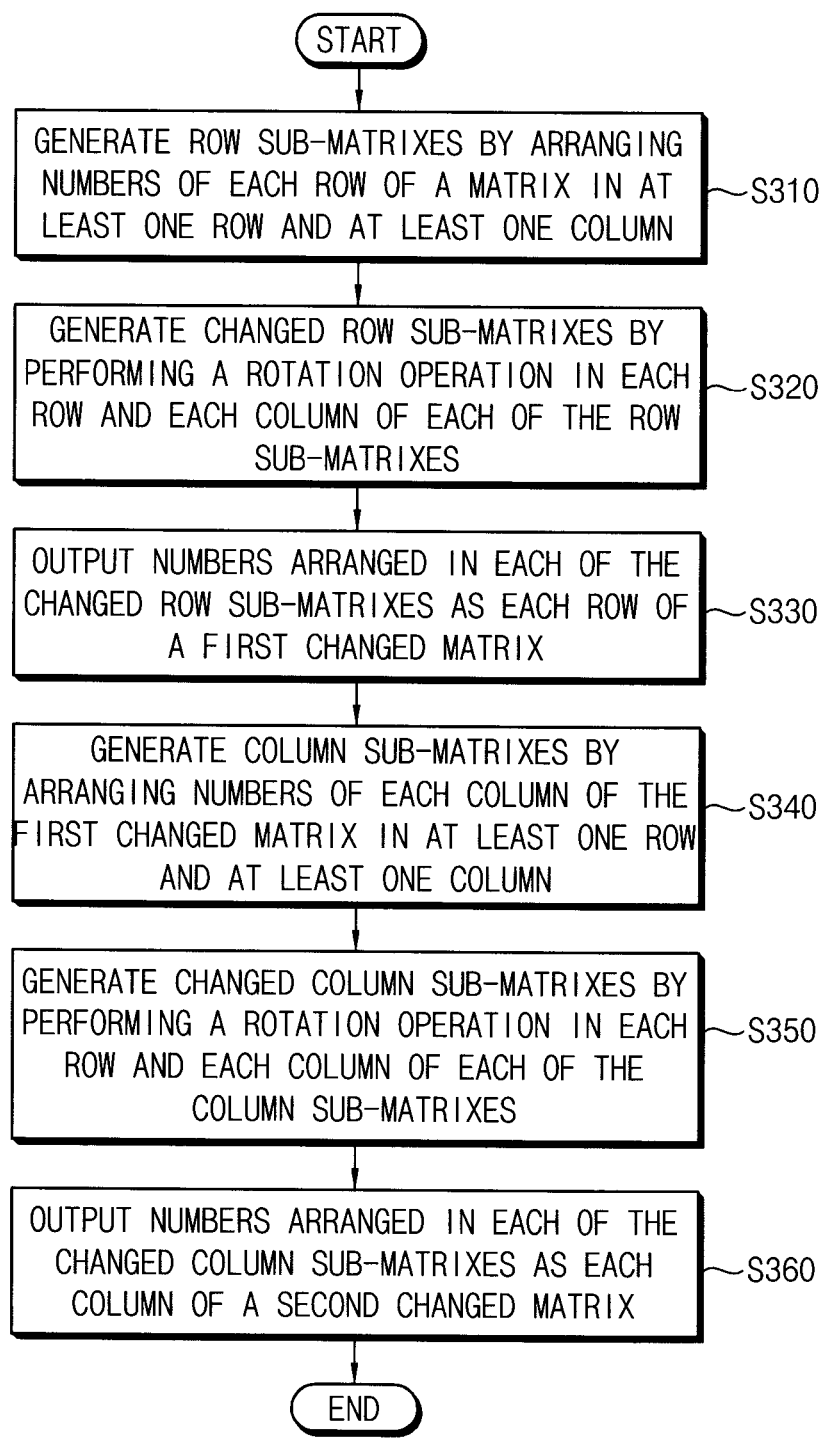
FIG. 17 is a flow chart illustrating an example in which a shuffle operation is performed by a method of FIG. 1.

FIG. 17 is a flow chart illustrating an example in which a shuffle operation is performed by a method of FIG. 1.

Referring to FIG. 17, the method of FIG. 1 may generate row sub-matrixes by arranging numbers of each row of a matrix in at least one row and at least one column, the matrix being generated by arranging N numbers, where N is an integer equal to or greater than 2, in at least one row and at least one column (Step S310). Then, the method of FIG. 1 may generate changed row sub-matrixes by performing a rotation operation in each row and each column of each of the row sub-matrixes (Step S320), and may output numbers arranged in each of the changed row sub-matrixes as each row of a first changed matrix (Step S330). Subsequently, the method of FIG. 1 may generate column sub-matrixes by arranging numbers of each column of the first changed matrix in at least one row and at least one column (Step S340), may generate changed column sub-matrixes by performing a rotation operation in each row and each column of each of the column sub-matrixes (Step S350), and then may output numbers arranged in each of the changed column sub-matrixes as each column of a second changed matrix (Step S360). In the method of FIG. 1, a shuffle operation in each row of the matrix may correspond an operation by which a changed row sub-matrix is generated by performing a rotation operation in each row and each column of a row sub-matrix, the row sub-matrix being generated by arranging numbers of one row of the matrix in at least one row and at least one column, and then numbers of the changed row sub-matrix are output according to rows or columns. Similarly, a shuffle operation in each column of the first changed matrix may correspond an operation by which a changed column sub-matrix is generated by performing a rotation operation in each row and each column of a column sub-matrix, the column sub-matrix being generated by arranging numbers of one column of the first changed matrix in at least one row and at least one column, and then numbers of the changed column sub-matrix are output according to rows or columns. Hereinafter, an example in which the method of FIG. 1 performs a shuffle operation will be described in detail.

FIGS. 18 through 23 are diagrams illustrating an example in which a random permutation is generated by a shuffle operation in FIG. 17.

Figure 18:
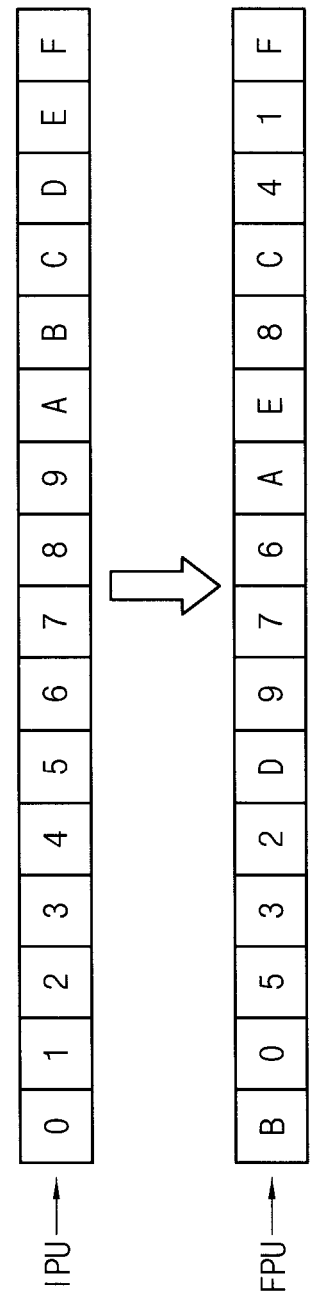

Referring to FIG. 18, the method of FIG. 1 may output a final permutation FPU (e.g., {B, 0, 5, 3, 2, D, 9, 7, 6, A, E, 8, C, 4, 1, F}) by performing a random arrangement operation on an initial permutation IPU (e.g., {0, 1, 2, 3, 4, 5, 6, 7, 8, 9, A, B, C, D, E, F}).

Figures 19, 20:
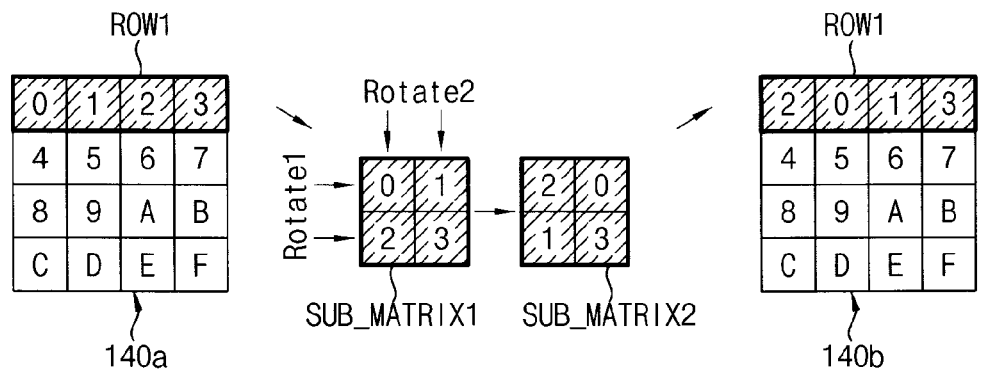
Figures 21, 22:
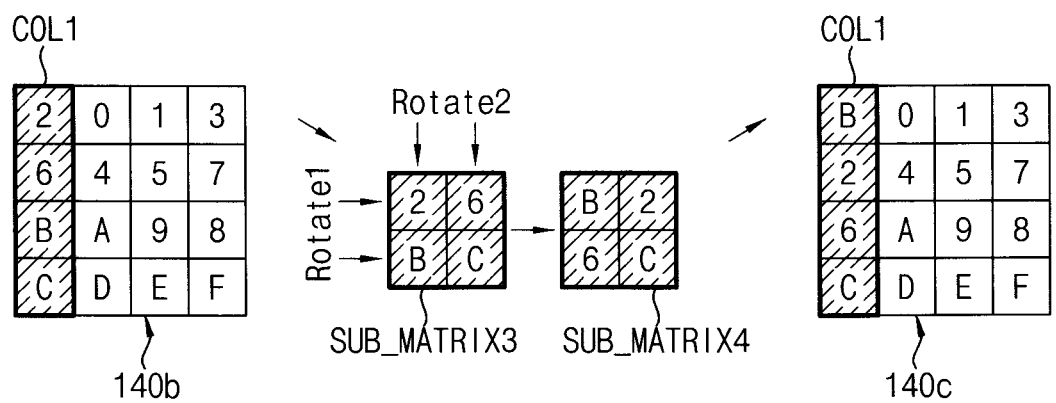

Referring to FIGS. 19 through 21, the method of FIG. 1 may generate a matrix 140a by arranging numbers (i.e., 0, 1, 2, 3, 4, 5, 6, 7, 8, 9, A, B, C, D, E, F) of the initial permutation IPU in 4 rows and 4 columns. Although it is illustrated in FIG. 19 that the matrix 140a includes first through fourth rows (i.e., {0, 1, 2, 3}, {4, 5, 6, 7}, {8, 9, A, B}, {C, D, E, F}) by arranging numbers of the initial permutation IPU based on a sequence of the initial permutation IPU, a sequence for arranging numbers of the initial permutation IPU is not limited thereto. That is, a sequence for arranging numbers of the initial permutation IPU may be variously determined regardless of a sequence of the initial permutation IPU. Then, the method of FIG. 1 may generate a first changed matrix 140b by performing a shuffle operation (i.e., SUFF_1, SUFF_2, SUFF_3, SUFF_4) in each row of the matrix 140a. That is, a first shuffle operation SUFF_1 may be performed in the first row (i.e., {0, 1, 2, 3}) of the matrix 140a, a second shuffle operation SUFF_2 may be performed in the second row (i.e., {4, 5, 6, 7}) of the matrix 140a, a third shuffle operation SUFF_3 may be performed in the third row (i.e., {8, 9, A, B}) of the matrix 140a, and a fourth shuffle operation SUFF_4 may be performed in the fourth row (i.e., {C, D, E, F}) of the matrix 140a.

FIG. 20 shows an example in which a first row (i.e., {2, 0, 1, 3}) of the first changed matrix 140b is generated by performing the first shuffle operation SUFF_1 in the first row (i.e., {0, 1, 2, 3}) of the matrix 140a. In other words, the method of FIG. 1 may generate a row sub-matrix SUB_MATRIX1 by arranging numbers (i.e., 0, 1, 2, 3) of the first row of the matrix 140a in at least one row and at least one column. In one example embodiment, numbers (i.e., 0, 1, 2, 3) of the first row of the matrix 140a may be sequentially arranged in the row sub-matrix SUB_MATRIX1. In another example embodiment, numbers (i.e., 0, 1, 2, 3) of the first row of the matrix 140a may be randomly arranged in the row sub-matrix SUB_MATRIX1. Then, the method of FIG. 1 may generate a changed row sub-matrix SUB_MATRIX2 by performing a rotation operation (i.e., ROTATE1, ROTATE2) in each row and each column of the row sub-matrix SUB_MATRIX1. Here, a row random number may be independently selected for each row of the row sub-matrix SUB_MATRIX1, and a column random number may be independently selected for each column of the row sub-matrix SUB_MATRIX1. In addition, a range of the row random number may be between 0 and $2^{\lceil log_2 w \rceil}-1$, where w is the quantity of numbers arranged in each row of the row sub-matrix SUB_MATRIX1. Further, a range of the column random number may be between 0 and $2^{\lceil log_2 w \rceil}-1$, where w is the quantity of numbers arranged in each column of the row sub-matrix SUB_MATRIX1. Subsequently, the method of FIG. 1 may output numbers (i.e., 2, 0, 1, 3) arranged in the changed row sub-matrix SUB_MATRIX2 according to rows or columns as a first row of the first changed matrix 140b. In this manner, second through fourth rows of the first changed matrix 140b may be generated by performing second through fourth shuffle operations SUFF_2, SUFF_3, SUFF_4 in the second through fourth rows of the matrix 140a, respectively.

Figure 23:
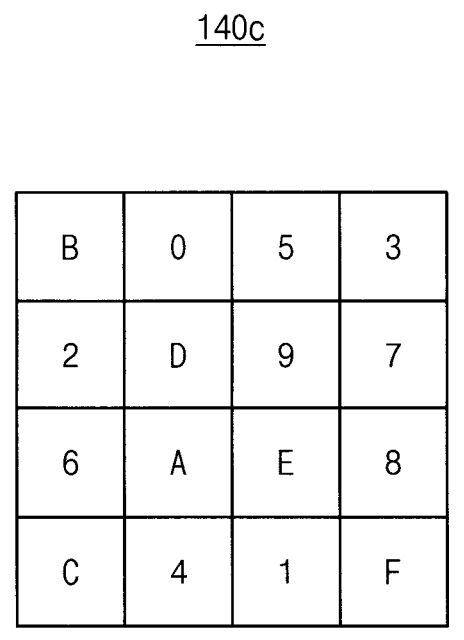

Referring to FIGS. 21 through 23, the method of FIG. 1 may generate a second changed matrix 140c by performing a shuffle operation (i.e., SUFF_1, SUFF_2, SUFF_3, SUFF_4) in each column of the first changed matrix 140b. That is, a first shuffle operation SUFF_1 may be performed in the first column (i.e., {2, 6, B, C}) of the first changed matrix 140b, a second shuffle operation SUFF_2 may be performed in the second column (i.e., {0, 4, A, D}) of the first changed matrix 140b, a third shuffle operation SUFF_3 may be performed in the third column (i.e., {1, 5, 9, E}) of the first changed matrix 140b, and a fourth shuffle operation SUFF_4 may be performed in the fourth column (i.e., {3, 7, 8, F}) of the first changed matrix 140b.

FIG. 22 shows an example in which a first column (i.e., {B, 2, 6, C}) of the second changed matrix 140c is generated by performing the first shuffle operation SUFF_1 in the first column (i.e., {2, 6, B, C}) of the first changed matrix 140b. In other words, the method of FIG. 1 may generate a column sub-matrix SUB_MATRIX3 by arranging numbers (i.e., 2, 6, B, C) of the first column of the first changed matrix 140b in at least one row and at least one column. In one exemplary embodiment, numbers (i.e., 2, 6, B, C) of the first column of the first changed matrix 140b may be sequentially arranged in the column sub-matrix SUB_MATRIX3. In another exemplary embodiment, numbers (i.e., 2, 6, B, C) of the first column of the first changed matrix 140b may be randomly arranged in the column sub-matrix SUB_MATRIX3. Then, the method of FIG. 1 may generate a changed column sub-matrix SUB_MATRIX4 by performing a rotation operation (i.e., ROTATE1, ROTATE2) in each row and each column of the column sub-matrix SUB_MATRIX3. Here, a row random number may be independently selected for each row of the column sub-matrix SUB_MATRIX3, and a column random number may be independently selected for each column of the column sub-matrix SUB_MATRIX3. In addition, a range of the row random number may be between 0 and $2^{\lceil log_2 w \rceil}-1$, where w is the quantity of numbers arranged in each row of the column sub-matrix SUB_MATRIX3. Further, a range of the column random number may be between 0 and $2^{\lceil log_2 w \rceil}-1$, where w is the quantity of numbers arranged in each column of the column sub-matrix SUB_MATRIX3. Subsequently, the method of FIG. 1 may output numbers (i.e., B, 2, 6, C) arranged in the changed column sub-matrix SUB_MATRIX4 according to rows or columns as a first column of the second changed matrix 140c. In this manner, second through fourth columns of the second changed matrix 140c may be generated by performing second through fourth shuffle operations SUFF_2, SUFF_3, SUFF_4 in the second through fourth columns of the first changed matrix 140b, respectively.

As illustrated in FIG. 23, the method of FIG. 1 may output numbers arranged in the second changed matrix 140c according to rows or columns. It is illustrated in FIG. 18 that numbers arranged in the second changed matrix 140c are sequentially output according to rows. That is, the final permutation FPU (i.e., {B, 0, 5, 3, 2, D, 9, 7, 6, A, E, 8, C, 4, 1, F}) may be generated by sequentially outputting the first row (i.e., {B, 0, 5, 3}) of the second changed matrix 140c, the second row (i.e., {2, D, 9, 7}) of the second changed matrix 140c, the third row (i.e., {6, A, E, 8}) of the second changed matrix 140c, and the fourth row (i.e., {C, 4, 1, F}) of the second changed matrix 140c. However, the present exemplary embodiment is not limited thereto. For example, numbers arranged in the second changed matrix 140c may be sequentially output according to columns. As described above, the method of FIG. 1 may be implemented by a simple structure (i.e., hardware) in which a plurality of multiplexers are coupled using a plurality of wires because the method of FIG. 1 generates a random permutation by performing a shuffle operation in each row and each column of the matrix 140a corresponding to the initial permutation IPU. In addition, the method of FIG. 1 may efficiently use a binary random source, the binary random source being applied to each row and each column of the matrix 140a, when the method of FIG. 1 generates a random permutation based on the binary random source. Hereinafter, an example of hardware by which the method of FIG. 1 is implemented will be described in detail.

Figure 24:
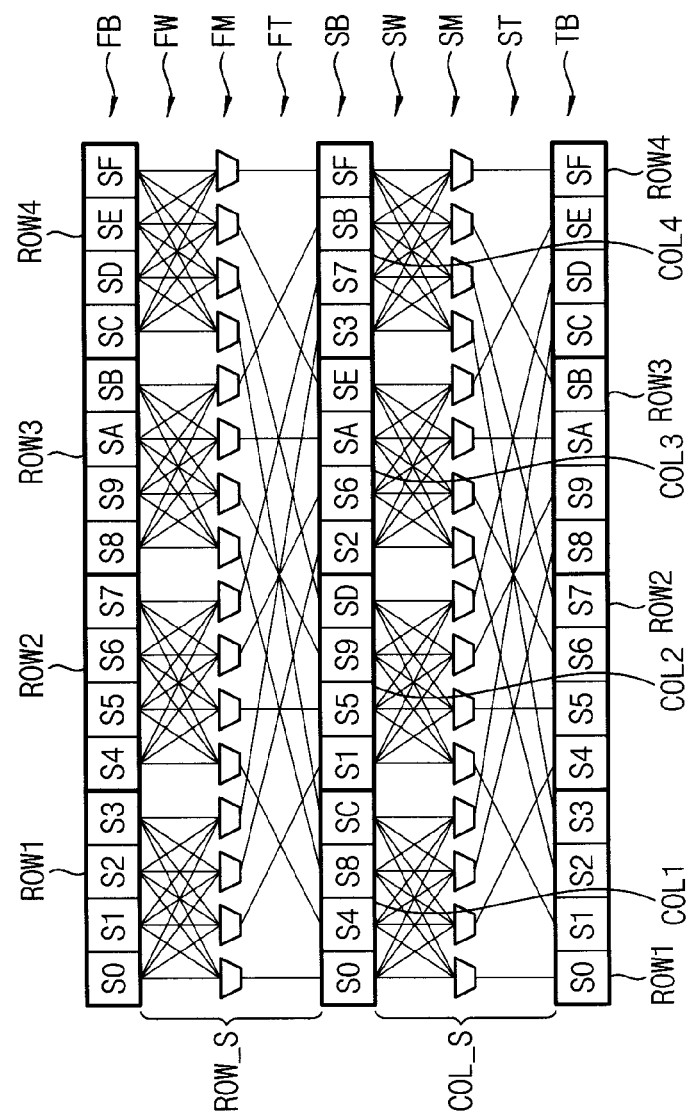
FIG. 24 is a circuit diagram illustrating an example in which a random permutation is generated by a shuffle operation in FIG. 17.

FIG. 24 is a circuit diagram illustrating an example in which a random permutation is generated by a shuffle operation in FIG. 17.

Referring to FIG. 24, the operations of the random permutation may be implemented by hardware (i.e., a simple structure) so that the method of FIG. 1 generates a random permutation by performing a shuffle operation based on a matrix. In detail, the hardware may include a first buffer unit FB, a first wire unit FW, a first multiplexer unit FM, a first transpose wire unit FT, a second buffer unit SB, a second wire unit SW, a second multiplexer unit SM, a second transpose wire unit ST, and a third buffer unit TB.

The first buffer unit FB may correspond to a 4×4 matrix. The first buffer unit FB may receive an initial permutation including 16 numbers, and may arrange 16 numbers of the initial permutation in 4 rows and 4 columns. For example, the first buffer unit FB may be implemented using a memory device for temporarily storing 16 numbers of the initial permutation, a buffer device, a delay device, etc. In one exemplary embodiment, the first buffer unit FB may arrange 16 numbers of the initial permutation based on a sequence of the initial permutation. In another exemplary embodiment, the first buffer unit FB may randomly arrange 16 numbers of the initial permutation (i.e., regardless of a sequence of the initial permutation). As illustrated in FIG. 24, the first buffer unit FB may have first through fourth rows ROW1 through ROW4, each of the first through fourth rows ROW1 through ROW4 including 4 numbers. Thus, first numbers of the first through fourth rows ROW1 through ROW4 may constitute a first column of the 4×4 matrix, second numbers of the first through fourth rows ROW1 through ROW4 may constitute a second column of the 4×4 matrix, third numbers of the first through fourth rows ROW1 through ROW4 may constitute a third column of the 4×4 matrix, and fourth numbers of the first through fourth rows ROW1 through ROW4 may constitute a fourth column of the 4×4 matrix. The first wire unit FW may couple the first buffer unit FB to the first multiplexer unit FM. Here, the first wire unit FW may couple the first buffer unit FB to the first multiplexer unit FM according to rows (i.e., ROW1, ROW2, ROW3, ROW4) of the 4×4 matrix.

The first multiplexer unit FM may include 16 multiplexers. Here, one group of the first multiplexer unit FM may include 4 multiplexers. That is, the first row ROW1 of the first buffer unit FB may be coupled to a first group of the first multiplexer unit FM, the second row ROW2 of the first buffer unit FB may be coupled to a second group of the first multiplexer unit FM, the third row ROW3 of the first buffer unit FB may be coupled to a third group of the first multiplexer unit FM, and the fourth row ROW4 of the first buffer unit FB may be coupled to a fourth group of the first multiplexer unit FM. Here, a selection signal (i.e., a binary random source) input to 4 multiplexers of each group of the first multiplexer unit FM is generated by a shuffle operation. The first transpose wire unit FT may couple the first multiplexer unit FM to the second buffer unit SB.

Here, the first transpose wire unit FT may distribute 4 multiplexers of each group of the first multiplexer unit FM to first through fourth columns COL1 through COL4 of the second buffer unit SB. That is, the first transpose wire unit FT may prepare a shuffle operation for each column (i.e., COL1, COL2, COL3, COL4) of the 4×4 matrix. Thus, a shuffle operation ROW_S may be performed in each row (i.e., ROW1, ROW2, ROW3, ROW4) of the 4×4 matrix by the first buffer unit FB, the first wire unit FW, the first multiplexer unit FM, and the first transpose wire unit FT.

The second buffer unit SB may also be implemented using a memory device for temporarily storing 16 numbers, a buffer device, a delay device, etc. As illustrated in FIG. 24, the second buffer unit SB may have the first through fourth columns COL1 through COL4, each of the first through fourth columns COL1 through COL4 including 4 numbers. Thus, first numbers of the first through fourth columns COL1 through COL4 may constitute a first row of the 4×4 matrix, second numbers of the first through fourth columns COL1 through COL4 may constitute a second row of the 4×4 matrix, third numbers of the first through fourth columns COL1 through COL4 may constitute a third row of the 4×4 matrix, and fourth numbers of the first through fourth columns COL1 through COL4 may constitute a fourth row of the 4×4 matrix. The second wire unit SW may couple the second buffer unit SB to the second multiplexer unit SM. Here, the second wire unit SW may couple the second buffer unit SB to the second multiplexer unit SM according to columns (i.e., COL1, COL2, COL3, COL4) of the 4×4 matrix.

The second multiplexer unit SM may include 16 multiplexers. Here, one group of the second multiplexer unit SM may include 4 multiplexers. That is, the first column COL1 of the second buffer unit SB may be coupled to a first group of the second multiplexer unit SM, the second column COL2 of the second buffer unit SB may be coupled to a second group of the second multiplexer unit SM, the third column COL3 of the second buffer unit SB may be coupled to a third group of the second multiplexer unit SM, and the fourth column COL4 of the second buffer unit SB may be coupled to a fourth group of the second multiplexer unit SM. Here, a selection signal (i.e., a binary random source) input to 4 multiplexers of each group of the second multiplexer unit SM is generated by a shuffle operation. The second transpose wire unit ST may couple the second multiplexer unit SM to the third buffer unit TB. Here, the second transpose wire unit ST may distribute 4 multiplexers of each group of the second multiplexer unit SM to first through fourth rows ROW1 through ROW4 of the third buffer unit TB. Thus, a shuffle operation COL_S may be performed in each column (i.e., COL1, COL2, COL3, COL4) of the 4×4 matrix by the second buffer unit SB, the second wire unit SW, the second multiplexer unit SM, and the second transpose wire unit ST.

Subsequently, the hardware may output numbers arranged in the third buffer unit TB according to rows. For example, the hardware may output a final permutation (i.e., a random permutation) by sequentially outputting the first through fourth rows ROW1 through ROW4 of the third buffer unit TB. Alternatively, the hardware may output the final permutation by randomly outputting the first through fourth rows ROW1 through ROW4 of the third buffer unit TB. In addition, the hardware may output numbers arranged in the third buffer unit TB according to columns. Thus, the method of FIG. 1 may be implemented by a simple structure having multiplexers and wires when being implemented by hardware. Although it is described above that a random permutation is generated by performing a shuffle operation in each row of the 4×4 matrix, and then by performing a shuffle operation in each column of the 4×4 matrix, the present exemplary embodiment is not limited thereto. Therefore, it should be understood that a random permutation can be generated by performing a shuffle operation in each column of the 4×4 matrix, and then by performing a shuffle operation in each row of the 4×4 matrix.

Figure 25:
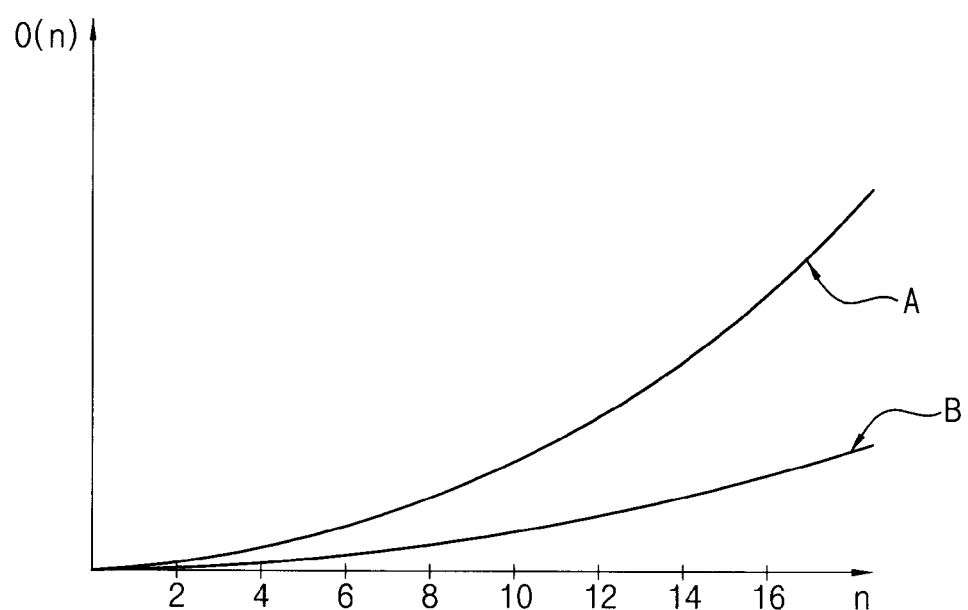
FIG. 25 is a graph illustrating a hardware complexity when a method of FIG. 1 is implemented by hardware.

FIG. 25 is a graph illustrating a hardware complexity when a method of FIG. 1 is implemented by hardware.

Referring to FIG. 25, a hardware complexity O(N) according to a size N of a random permutation is illustrated. Here, a first graph A indicates an entire hardware complexity $O(N^2)$ related to a conventional random permutation generating method such as Fisher and Yates method, etc. On the other hand, a second graph B indicates an entire hardware complexity $O(N^1.5)$ related to a method of FIG. 1.

As illustrated in FIG. 10, when the method of FIG. 1 generates a random permutation by performing a rotation operation, the method of FIG. 1 may be implemented by hardware that includes 32 four inputs and one output multiplexers (hereinafter, 4-1 multiplexers) and a plurality of wires. For example, since the number of the 4-1 multiplexers for randomly arranging 16 numbers (i.e., N=16) is 32 (i.e., 2*N=32), a hardware complexity based on the number of the 4-1 multiplexers may be O(2*N). In addition, since each of the 4-1 multiplexers has four inputs and one output (i.e., $N^0.5$=4), a hardware complexity based on four inputs and one output may be $O(N^0.5)$. Therefore, an entire hardware complexity may be $O(2*N^1.5)$ (i.e., $O(2*N)*O(N^0.5)$=$O(2*N^1.5)$). However, since a coefficient is negligible, an entire hardware complexity may be $O(N^1.5)$. Similarly, as illustrated in FIG. 24, when the method of FIG. 1 generates a random permutation by performing a shuffle operation, the method of FIG. 1 may be implemented by hardware that includes 32 4-1 multiplexers and a plurality of wires. Here, a manner in which the hardware of FIG. 10 generates a selection signal applied to the 4-1 multiplexers is different from a manner in which the hardware of FIG. 24 generates a selection signal applied to the 4-1 multiplexers. In detail, the hardware of FIG. 10 may apply a binary random source as a selection signal to the 4-1 multiplexers. On the other hand, the hardware of FIG. 24 may process a binary random source using sub-matrixes, and then may apply the binary random source as a selection signal to the 4-1 multiplexers. Here, a hardware complexity for processing a binary random source of 2 bits in the hardware of FIG. 24 is $O(N^1.25)$. Thus, when a hardware complexity $O(N^1.25)$ is added to a hardware complexity $O(N^1.5)$, an entire hardware complexity may be $O(N^1.5)$ because the hardware complexity $O(N^1.25)$ is negligible compared to the hardware complexity $O(N^1.5)$. As described above, the method of FIG. 1 may be implemented by a simple structure having multiplexers and wires when being implemented by hardware. In addition, the method of FIG. 1 may efficiently use a binary random source.

Figure 26:
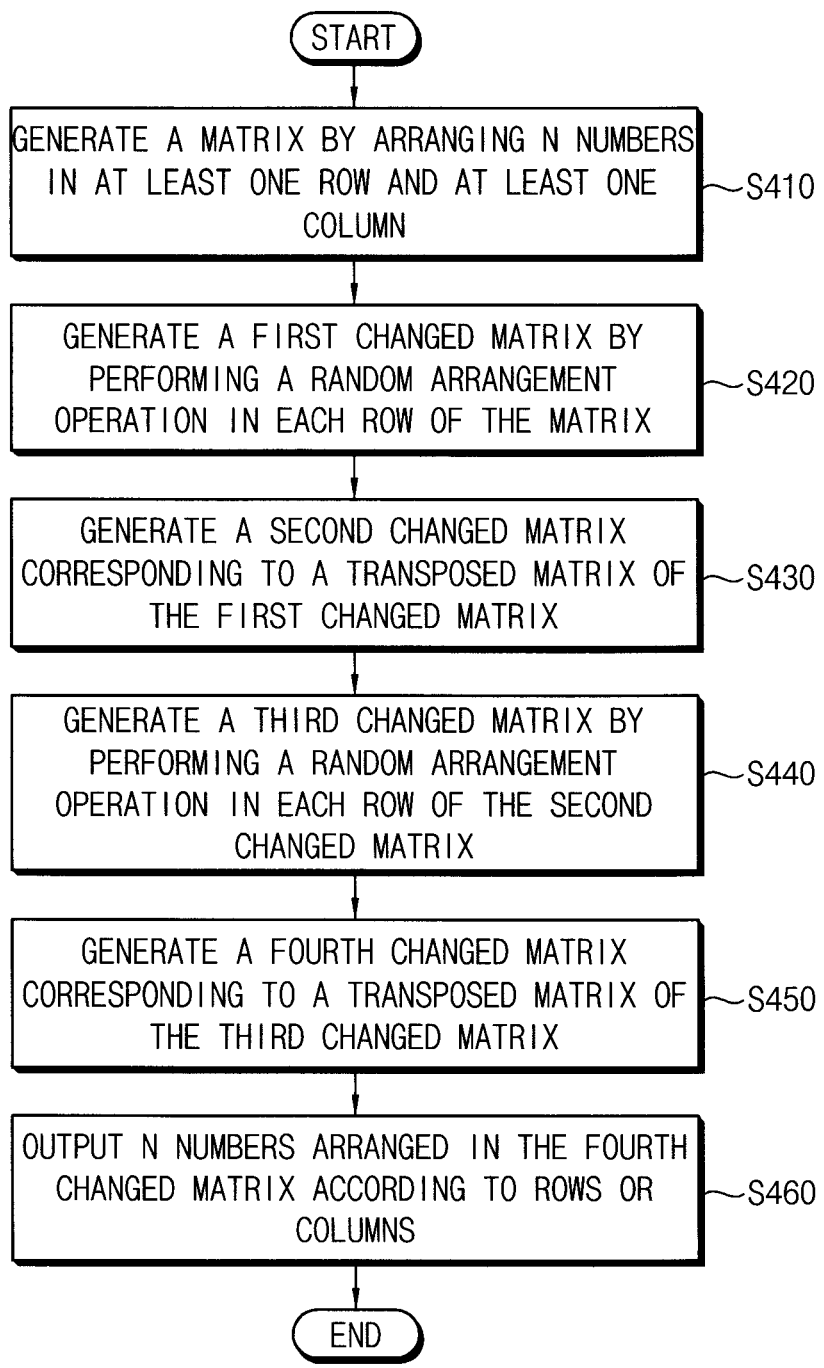
FIG. 26 is a flow chart illustrating a method of generating a random permutation according to an exemplary embodiment.

FIG. 26 is a flow chart illustrating a method of generating a random permutation according to an exemplary embodiment.

Referring to FIG. 26, the method of FIG. 26 may generate a matrix by arranging N numbers, where N is an integer equal to or greater than 2, in at least one row and at least one column (Step S410), may generate a first changed matrix by performing a random arrangement operation based on at least one random number in each row of the matrix (Step S420), and may generate a second changed matrix corresponding to a transposed matrix of the first changed matrix (Step S430). In addition, the method of FIG. 26 may generate a third changed matrix by performing a random arrangement operation based on at least one random number in each row of the second changed matrix (Step S440), may generate a fourth changed matrix corresponding to a transposed matrix of the third changed matrix (Step S450), and may output N numbers arranged in the fourth changed matrix according to rows or columns (Step S460). In exemplary embodiments, a square matrix or a rectangular matrix may be selected as the matrix.

The method of FIG. 26 may generate the matrix (e.g., the square matrix or the rectangular matrix) by arranging N numbers in at least one row and at least one column (Step S410). Here, N numbers may constitute an initial permutation. When N numbers are arranged in the matrix, N numbers may be arranged in the matrix based on a sequence of the initial permutation, or N numbers may be arranged in the matrix regardless of a sequence of the initial permutation. In exemplary embodiments, N numbers may have a binary form, respectively. For example, assuming that the initial permutation is {00, 01, 10, 11}, N numbers may include '00', '01', '10', and '11'. In this case, the initial permutation {00, 01, 10, 11} may be randomized by a binary random source {0, 1}.

After the matrix is generated by arranging N numbers in at least one row and at least one column (Step S410), the method of FIG. 1 may generate the first changed matrix by performing a random arrangement operation in each row of the square matrix or the rectangular matrix (Step S420). In one exemplary embodiment, the random arrangement operation may correspond to a rotation operation or a shuffle operation. Then, the method of FIG. 26 may generate the second changed matrix corresponding to the transposed matrix of the first changed matrix (Step S430). Thus, the method of FIG. 26 may not perform a random arrangement operation in each column of the first changed matrix. Instead, the method of FIG. 26 may perform a random arrangement operation in each row of the second changed matrix corresponding to the transposed matrix of the first changed matrix. After the second changed matrix is generated (Step S430), the method of FIG. 26 may generate the third changed matrix by performing a random arrangement operation in each row of the second changed matrix (Step S440). Here, the random arrangement operation may correspond to a rotation operation or a shuffle operation.

Subsequently, the method of FIG. 26 may generate the fourth changed matrix corresponding to the transposed matrix of the third changed matrix (Step S450), and then may output N numbers arranged in the fourth changed matrix according to rows or columns (Step S460). As described above, the method of FIG. 26 may generate a random permutation by performing a random arrangement operation (i.e., a rotation operation or a shuffle operation) in each row and each column of a matrix corresponding to an initial permutation. Thus, the method of FIG. 26 may be implemented by a simple structure (i.e., hardware) in which a plurality of multiplexers are coupled using a plurality of wires. In addition, the method of FIG. 26 may efficiently use a binary random source, the binary random source being applied to each row and each column of the matrix, when the method of FIG. 26 generates a random permutation based on the binary random source. Further, the method of FIG. 26 may be easily implemented by hardware compared to the method of FIG. 1 because the method of FIG. 26 does not perform a random arrangement operation in each row and each column of a matrix (i.e., the method of FIG. 26 performs a random arrangement operation in only each row of a matrix by using a transposed matrix). Although it is described above that a random permutation is generated by performing a random arrangement operation in each row of the matrix and the second changed matrix, the present exemplary embodiment is not limited thereto. Therefore, it should be understood that a random permutation can be generated by performing a random arrangement operation in each column of the matrix and the second changed matrix.

FIGS. 27 through 32 are diagrams illustrating an example in which a random permutation is generated by a method of FIG. 26.

Figure 27:
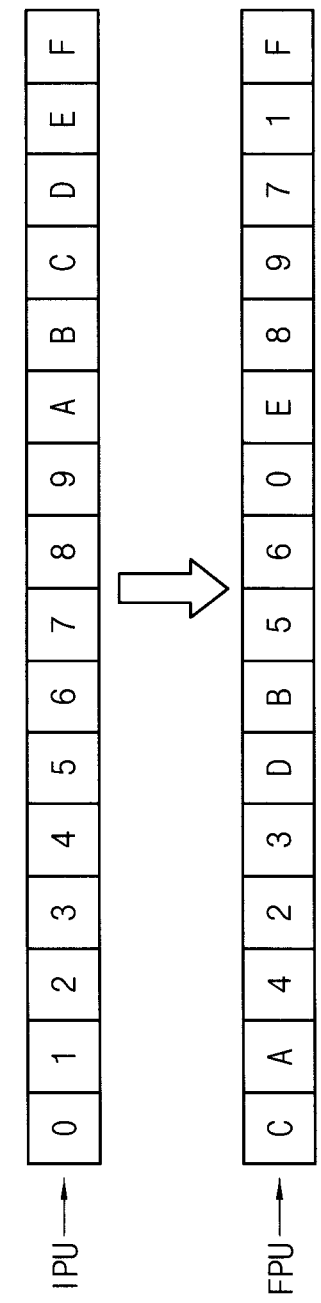
FIGS. 27 through 32 are diagrams illustrating an example in which a random permutation is generated by a method of FIG. 26.

Referring to FIG. 27, the method of FIG. 26 may output a final permutation FPU (e.g., {C, A, 4, 2, 3, D, B, 5, 6, 0, E, 8, 9, 7, 1, F}) by performing a random arrangement operation on an initial permutation IPU (e.g., {0, 1, 2, 3, 4, 5, 6, 7, 8, 9, A, B, C, D, E, F}).

Figures 28, 29:

Referring to FIGS. 28 and 29, the method of FIG. 26 may generate a matrix 220a by arranging numbers (i.e., 0, 1, 2, 3, 4, 5, 6, 7, 8, 9, A, B, C, D, E, F) of the initial permutation IPU in 4 rows and 4 columns. Although it is illustrated in FIG. 28 that the matrix 220a includes first through fourth rows (i.e., {0, 1, 2, 3}, {4, 5, 6, 7}, {8, 9, A, B}, {C, D, E, F}) by arranging numbers of the initial permutation IPU based on a sequence of the initial permutation IPU, a sequence for arranging numbers of the initial permutation IPU is not limited thereto. That is, a sequence for arranging numbers of the initial permutation IPU may be variously determined regardless of a sequence of the initial permutation IPU. Then, the method of FIG. 26 may generate a first changed matrix 220b by performing a random arrangement operation (i.e., RA_1, RA_2, RA_3, RA_4) in each row of the matrix 220a. Here, the random arrangement operation (i.e., RA_1, RA_2, RA_3, RA_4) may be a rotation operation or a shuffle operation. That is, a first random arrangement operation RA_1 may be performed in the first row (i.e., {0, 1, 2, 3}) of the matrix 220a, a second random arrangement operation RA_2 may be performed in the second row (i.e., {4, 5, 6, 7}) of the matrix 220a, a third random arrangement operation RA_3 may be performed in the third row (i.e., {8, 9, A, B}) of the matrix 220a, and a fourth random arrangement operation RA_4 may be performed in the fourth row (i.e., {C, D, E, F}) of the matrix 220a.

After a random arrangement operation (i.e., RA_1, RA_2, RA_3, RA_4) is performed in each row of the matrix 220a, the first changed matrix 220b may include first through fourth rows (i.e., {3, 0, 1, 2}, {6, 7, 4, 5}, {9, A, B, 8}, {C, D, E, F}). FIG. 29 shows an example of the first changed matrix 220b when a rotation operation is performed as the random arrangement operation in each row of the matrix 220a. Then, the method of FIG. 26 may generate the second changed matrix 220c corresponding to the transposed matrix of the first changed matrix 220b. Thus, the second changed matrix 220c may include first through fourth rows (i.e., {3, 6, 9, C}, {0, 7, A, D}, {1, 4, B, E}, {2, 5, 8, F}). Subsequently, the method of FIG. 26 may generate the third changed matrix 220d by performing a random arrangement operation (i.e., RA_1, RA_2, RA_3, RA_4) in each row of the second changed matrix 220c. Here, the random arrangement operation (i.e., RA_1, RA_2, RA_3, RA_4) may be a rotation operation or a shuffle operation. That is, a first random arrangement operation RA_1 may be performed in the first row (i.e., {3, 6, 9, C}) of the second changed matrix 220c, a second random arrangement operation RA_2 may be performed in the second row (i.e., {0, 7, A, D}) of the second changed matrix 220c, a third random arrangement operation RA_3 may be performed in the third row (i.e., {1, 4, B, E}) of the second changed matrix 220c, and a fourth random arrangement operation RA_4 may be performed in the fourth row (i.e., {2, 5, 8, F}) of the second changed matrix 220c.

Figures 30, 31:
Figures 32, 33:
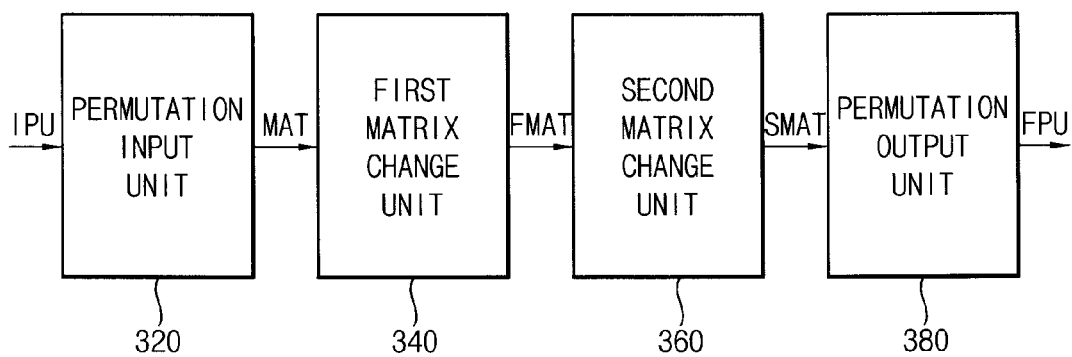
FIG. 33 is a block diagram illustrating a random permutation generating device according to example embodiments.

After a random arrangement operation (i.e., RA_1, RA_2, RA_3, RA_4) is performed in each row of the second changed matrix 220c, the third changed matrix 220d may include first through fourth rows (i.e., {C, 3, 6, 9}, {A, D, 0, 7}, {4, B, E, 1}, {2, 5, 8, F}). FIG. 31 shows an example of the third changed matrix 220d when a rotation operation is performed as the random arrangement operation in each row of the second changed matrix 220c. As illustrated in FIG. 32, the method of FIG. 26 may generate the fourth changed matrix 220e corresponding to the transposed matrix of the third changed matrix 220d. Thus, the fourth changed matrix 220e may include first through fourth rows (i.e., {C, A, 4, 2}, {3, D, B, 5}, {6, 0, E, 8}, {9, 7, 1, F}). Subsequently, the method of FIG. 26 may output numbers arranged in the fourth changed matrix 220e according to rows or columns. It is illustrated in FIG. 27 that numbers arranged in the fourth changed matrix 220e are sequentially output according to rows. That is, the final permutation FPU (i.e., {C, A, 4, 2, 3, D, B, 5, 6, 0, E, 8, 9, 7, 1, F}) may be generated by sequentially outputting the first row (i.e., {C, A, 4, 2}) of the fourth changed matrix 220e, the second row (i.e., {3, D, B, 5}) of the fourth changed matrix 220e, the third row (i.e., {6, 0, E, 8}) of the fourth changed matrix 220e, and the fourth row (i.e., {9, 7, 1, F}) of the fourth changed matrix 220e. However, the present exemplary embodiment is not limited thereto. For example, numbers arranged in the fourth changed matrix 220e may be sequentially output according to columns. As described above, the method of FIG. 26 may be implemented by a simple structure (i.e., hardware) in which a plurality of multiplexers are coupled using a plurality of wires because the method of FIG. 26 generates a random permutation by performing a random arrangement operation in each row and each column of the matrix 220a corresponding to the initial permutation IPU. In addition, the method of FIG. 26 may efficiently use a binary random source, the binary random source being applied to each row and each column of the matrix 220a, when the method of FIG. 26 generates a random permutation based on the binary random source.

FIG. 33 is a block diagram illustrating a random permutation generating device according to an exemplary embodiment.

Referring to FIG. 33, the random permutation generating device 300 may include a permutation input unit 320, a first matrix change unit 340, a second matrix change unit 360, and a permutation output unit 380.

The permutation input unit 320 may receive an initial permutation IPU having N numbers, where N is an integer equal to or greater than 2, and may arrange N numbers of the initial permutation IPU in a predetermined matrix MAT. In one exemplary embodiment, the predetermined matrix MAT may be a square matrix. In another exemplary embodiment, the predetermined matrix MAT may be a rectangular matrix. Here, N numbers of the initial permutation IPU may be arranged in the predetermined matrix MAT based on a sequence of the initial permutation IPU. Alternatively, N numbers of the initial permutation IPU may be arranged in the predetermined matrix MAT regardless of a sequence of the initial permutation IPU. In exemplary embodiments, N numbers of the initial permutation IPU may have a binary form, respectively. For example, assuming that the initial permutation IPU is {00, 01, 10, 11}, N numbers may include '00', '01', '10', and '11'. In this case, the initial permutation IPU may be randomized by a binary random source {0, 1}.

The first matrix change unit 340 may generate a first changed matrix FMAT by performing a random arrangement operation in each row of the predetermined matrix MAT based on at least one random number. In one exemplary embodiment, the random arrangement operation may be a rotation operation. That is, the first matrix change unit 340 may generate the first changed matrix FMAT by rotating numbers of each row of the predetermined matrix MAT by a row random number in a row direction. In this case, the row random number may be independently selected for each row of the predetermined matrix MAT. In addition, a range of the row random number may be between 0 and $2^{\lceil \log_2 j \rceil}-1$, where j is the quantity of numbers arranged in each row of the predetermined matrix MAT. In another exemplary embodiment, the random arrangement operation may be a shuffle operation. That is, the first matrix change unit 340 may generate row sub-matrixes by arranging numbers of each row of the predetermined matrix MAT in at least one row and at least one column, may generate changed row sub-matrixes by performing a rotation operation in each row and each column of each of the row sub-matrixes, and may output numbers arranged in each of the changed row sub-matrixes as each row of the first changed matrix FMAT.

The second matrix change unit 360 may generate a second changed matrix SMAT by performing a random arrangement operation in each column of the first changed matrix FMAT based on at least one random number. In one exemplary embodiment, the random arrangement operation may be a rotation operation. That is, the second matrix change unit 360 may generate the second changed matrix SMAT by rotating numbers of each column of the first changed matrix FMAT by a column random number in a column direction. In this case, the column random number may be independently selected for each column of the first changed matrix FMAT. In addition, a range of the column random number may be between 0 and $2^{\lceil \log_2 k \rceil}-1$, where k is the quantity of numbers arranged in each column of the first changed matrix FMAT. In another exemplary embodiment, the random arrangement operation may be a shuffle operation. That is, the second matrix change unit 360 may generate column sub-matrixes by arranging numbers of each column of the first changed matrix FMAT in at least one row and at least one column, may generate changed column sub-matrixes by performing a rotation operation in each row and each column of each of the column sub-matrixes, and may output numbers arranged in each of the changed column sub-matrixes as each column of the second changed matrix SMAT. Then, the permutation output unit 380 may generate a final permutation FPU by outputting N numbers arranged in the second changed matrix SMAT according to rows or columns.

Although it is described above that the first matrix change unit 340 generates the first changed matrix FMAT by performing a random arrangement operation in each row of the predetermined matrix MAT, and then the second matrix change unit 360 generates the second changed matrix SMAT by performing a random arrangement operation in each column of the first changed matrix FMAT, the present exemplary embodiment is not limited thereto. Thus, the first matrix change unit 340 may generate the first changed matrix FMAT by performing a random arrangement operation in each column of the predetermined matrix MAT, and then the second matrix change unit 360 may generate the second changed matrix SMAT by performing a random arrangement operation in each row of the first changed matrix FMAT.

Figure 34:
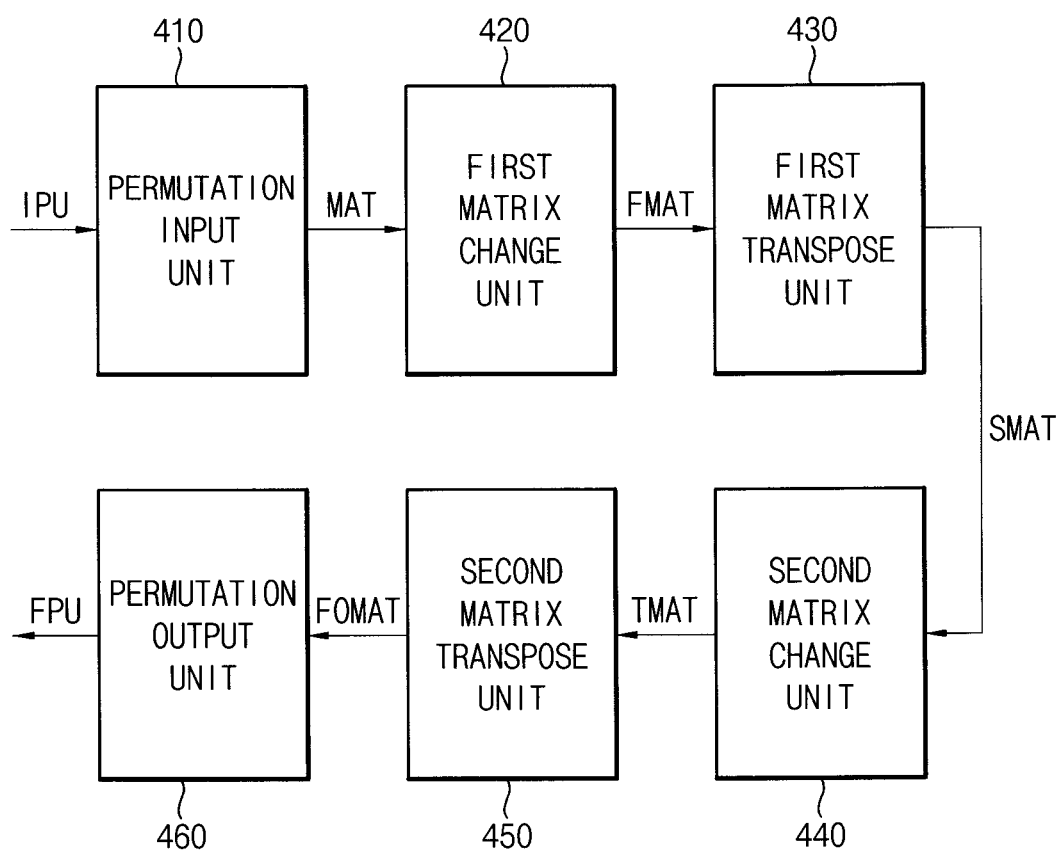
FIG. 34 is a block diagram illustrating a random permutation generating device according to an exemplary embodiment.

FIG. 34 is a block diagram illustrating a random permutation generating device according to example embodiments.

Referring to FIG. 34, the random permutation generating device 400 may include a permutation input unit 410, a first matrix change unit 420, a first matrix transpose unit 430, a second matrix change unit 440, a second matrix transpose unit 450, and a permutation output unit 460.

The permutation input unit 410 may receive an initial permutation IPU having N numbers, where N is an integer equal to or greater than 2, and may arrange N numbers of the initial permutation IPU in a predetermined matrix MAT. In one exemplary embodiment, the predetermined matrix MAT may be a square matrix. In another exemplary embodiment, the predetermined matrix MAT may be a rectangular matrix. Here, N numbers of the initial permutation IPU may be arranged in the predetermined matrix MAT based on a sequence of the initial permutation IPU. Alternatively, N numbers of the initial permutation IPU may be arranged in the predetermined matrix MAT regardless of a sequence of the initial permutation IPU. In exemplary embodiments, N numbers of the initial permutation IPU may have a binary form, respectively. For example, assuming that the initial permutation IPU is {00, 01, 10, 11}, N numbers may include '00', '01', '10', and '11'. In this case, the initial permutation IPU may be randomized by a binary random source {0, 1}.

The first matrix change unit 420 may generate a first changed matrix FMAT by performing a random arrangement operation in each row of the predetermined matrix MAT based on at least one random number. In one exemplary embodiment, the random arrangement operation may be a rotation operation. That is, the first matrix change unit 420 may generate the first changed matrix FMAT by rotating numbers of each row of the predetermined matrix MAT by a first row random number in a row direction. In this case, the first row random number may be independently selected for each row of the predetermined matrix MAT. In addition, a range of the first row random number may be between 0 and $2^{\lceil \log_2 j \rceil}-1$, where j is the quantity of numbers arranged in each row of the predetermined matrix MAT. In another exemplary embodiment, the random arrangement operation may be a shuffle operation. That is, the first matrix change unit 420 may generate first sub-matrixes by arranging numbers of each row of the predetermined matrix MAT in at least one row and at least one column, may generate first changed sub-matrixes by performing a rotation operation in each row and each column of each of the first sub-matrixes, and may output numbers arranged in each of the first changed sub-matrixes as each row of the first changed matrix FMAT.

The first matrix transpose unit 430 may generate a second changed matrix SMAT corresponding to a transposed matrix of the first changed matrix FMAT. Thus, a random arrangement operation may not be performed in each column of the first changed matrix FMAT. Instead, a random arrangement operation may be performed in each row of the second changed matrix SMAT corresponding to a transposed matrix of the first changed matrix FMAT. The second matrix change unit 440 may generate a third changed matrix TMAT by performing a random arrangement operation in each row of the second changed matrix SMAT based on at least one random number. In one exemplary embodiment, the random arrangement operation may be a rotation operation. That is, the second matrix change unit 440 may generate the third changed matrix TMAT by rotating numbers of each row of the second changed matrix SMAT by a second row random number in a row direction. In this case, the second row random number may be independently selected for each row of the second changed matrix SMAT. In addition, a range of the second row random number may be between 0 and $2^{\lceil \log_2 k \rceil}-1$, where k is the quantity of numbers arranged in each row of the second changed matrix SMAT. In another exemplary embodiment, the random arrangement operation may be a shuffle operation. That is, the second matrix change unit 440 may generate second sub-matrixes by arranging numbers of each row of the second changed matrix SMAT in at least one row and at least one column, may generate second changed sub-matrixes by performing a rotation operation in each row and each column of each of the second sub-matrixes, and may output numbers arranged in each of the second changed submatrixes as each row of the third changed matrix TMAT.

Subsequently, the second matrix transpose unit 450 may generate a fourth changed matrix FOMAT corresponding to a transposed matrix of the third changed matrix TMAT. The permutation output unit 460 may generate a final permutation FPU by outputting numbers arranged in the fourth changed matrix FOMAT according to rows or columns. Although it is described above that the first matrix change unit 420 generates the first changed matrix FMAT by performing a random arrangement operation in each row of the predetermined matrix MAT, and then the second matrix change unit 440 generates the third changed matrix TMAT by performing a random arrangement operation in each row of the second changed matrix SMAT, the present exemplary embodiment is not limited thereto. Thus, the first matrix change unit 420 may generate the first changed matrix FMAT by performing a random arrangement operation in each column of the predetermined matrix MAT, and then the second matrix change unit 440 may generate the third changed matrix TMAT by performing a random arrangement operation in each column of the second changed matrix SMAT.

Figure 35:
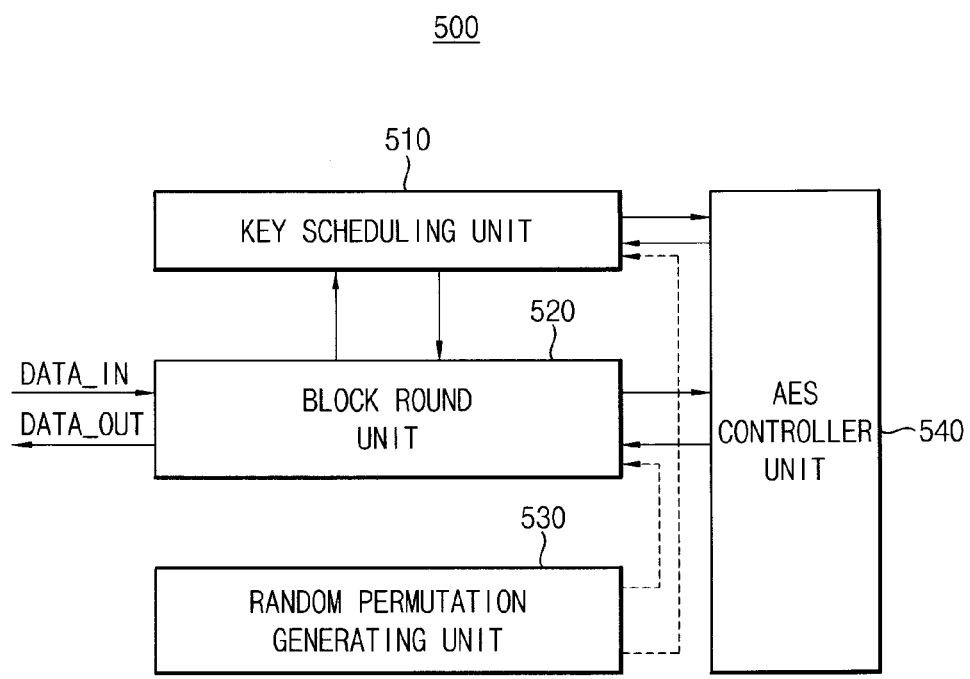
FIG. 35 is a block diagram illustrating an encryption/decryption device according to an exemplary embodiment.

FIG. 35 is a block diagram illustrating an encryption/decryption device according to an exemplary embodiment.

Referring to FIG. 35, the encryption/decryption device 500 may include a key scheduling unit 510, a block round unit 520, a random permutation generating unit 530, and an advanced encryption standard (AES) controller unit 540. Here, the random permutation generating unit 530 may correspond to the random permutation generating device 300 of FIG. 33 or the random permutation generating device 400 of FIG. 34.

The key scheduling unit 510 may generate a plurality of round keys based on an input key in order to perform each round. According to some exemplary embodiments, the key scheduling unit 510 may generate a plurality of round keys of 128 bits, a plurality of round keys of 192 bits, or a plurality of round keys of 256 bits. For example, when AES algorithm applied to the encryption/decryption device 500 uses a round key of 128 bits, the round key of 128 bits may include 4 partial round keys of 32 bits for the key scheduling unit 510. In one exemplary embodiment, the key scheduling unit 510 may include a storing unit for temporarily store a plurality of round keys. The block round unit 520 may encrypt a plain text or may decrypt an encrypted text by performing a plurality of rounds based on the round keys. For example, the block round unit 520 may receive and encrypt a plain text as input data DATA_IN, and then may output an encrypted text as output data DATA_OUT. On the other hand, the block round unit 520 may receive and decrypt an encrypted text as input data DATA_IN, and then may output a plain text as output data DATA_OUT. The random permutation generating unit 530 may generate a random permutation (i.e., a final permutation) by perform a random arrangement operation on an initial permutation based on a predetermined matrix. Thus, the random permutation generating unit 530 may temporally and/or spatially randomize processing of data-sboxes that is performed by a block round unit 520 and/or processing of key-sboxes that is performed by a key scheduling unit in each round. Here, the random arrangement operation may be a rotation operation or a shuffle operation.

Generally, each round may be performed by performing a byte-substitution operation, a shift-row operation, a mix-column operation, and an add-round-key operation. In each round, processing of key-sboxes may be performed in the key scheduling unit 510, and processing of data-sboxes may be performed in the block round unit 520. Here, the random permutation generating unit 530 may temporally and/or spatially randomize processing of key-sboxes that is performed in the key scheduling unit 510 and/or processing of data-sboxes that is performed in the block round unit 520. As a result, the encryption/decryption device 500 may achieve a high data security against an external attack such as Side Channel Analysis (SCA). In detail, the random permutation generating unit 530 may receive an initial permutation that includes numbers having a binary form, and may output a random permutation (i.e., a final permutation) that includes numbers having a binary form by performing a random arrangement operation on the initial permutation. For this operation, the random permutation generating unit 530 may include a permutation input unit, a first matrix change unit, a second matrix change unit, and a permutation output unit. Alternatively, the random permutation generating unit 530 may include a permutation input unit, a first matrix change unit, a first matrix transpose unit, a second matrix change unit, a second matrix transpose unit, and a permutation output unit. Since the random permutation generating unit 530 is described above, duplicated descriptions will be omitted below. The AES controller unit 540 may control the key scheduling unit 510, the block round unit 520, and the random permutation generating unit 530 based on AES method (i.e., AES algorithm).

Figure 36:
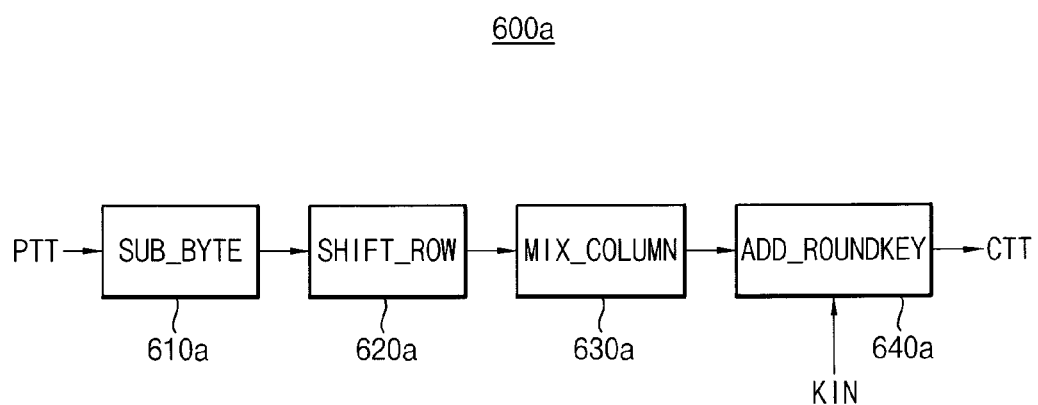
FIG. 36 is a block diagram illustrating an example in which an encryption operation is performed by an encryption/decryption device of FIG. 35.
Figure 37:
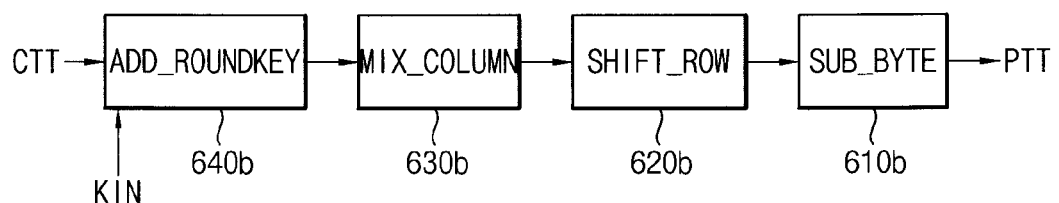
FIG. 37 is a block diagram illustrating an example in which a decryption operation is performed by an encryption/decryption device of FIG. 35.

FIG. 36 is a block diagram illustrating an example in which an encryption operation is performed by an encryption/decryption device of FIG. 35. FIG. 37 is a block diagram illustrating an example in which a decryption operation is performed by an encryption/decryption device of FIG. 35.

Referring to FIGS. 36 and 37, when the block round unit 520 encrypts a plain text, each round 600a may be performed (i.e., completed) by performing a byte-substitution operation 610a, a shift-row operation 620a, a mix-column operation 630a, and an add-round-key operation 640a in the order named. Thus, plain data PTT may be encrypted to encrypted data CTT by the round 600a. Here, an exclusive-or (XOR) operation may be performed on a round key KIN input from the key scheduling unit 510 in the add-round-key operation 640a. The encryption/decryption device 500 of FIG. 35 may complete an encryption operation by repeatedly performing the round 600a a predetermined number of times. On the other hand, when the block round unit 520 decrypts encrypted data, each round 600b may be performed (i.e., completed) by performing an add-round-key operation 640b, a mix-column operation 630b, a shift-row operation 620b, and a byte-substitution operation 610b in the order named. Thus, encrypted data CTT may be decrypted to plain data PTT by the round 600b. Here, an XOR operation may be performed on a round key KIN input from the key scheduling unit 510 in the add-round-key operation 640b. Similarly, the encryption/decryption device 500 of FIG. 35 may complete a decryption operation by repeatedly performing the round 600b a predetermined number of times. As described above, an order of internal operations of the round 600a by which a plain text is encrypted may be contrary to an order of internal operations of the round 600b by which an encrypted text is decrypted. However, the present exemplary embodiment is not limited thereto. For example, the round 600a by which a plain text is encrypted may include additional internal operations according to required conditions, and the round 600b by which an encrypted text is decrypted may also include additional internal operations according to required conditions. Further, an order of internal operations of the round 600a and an order of internal operations of the round 600b may be variously changed according to required conditions.

Figure 38:
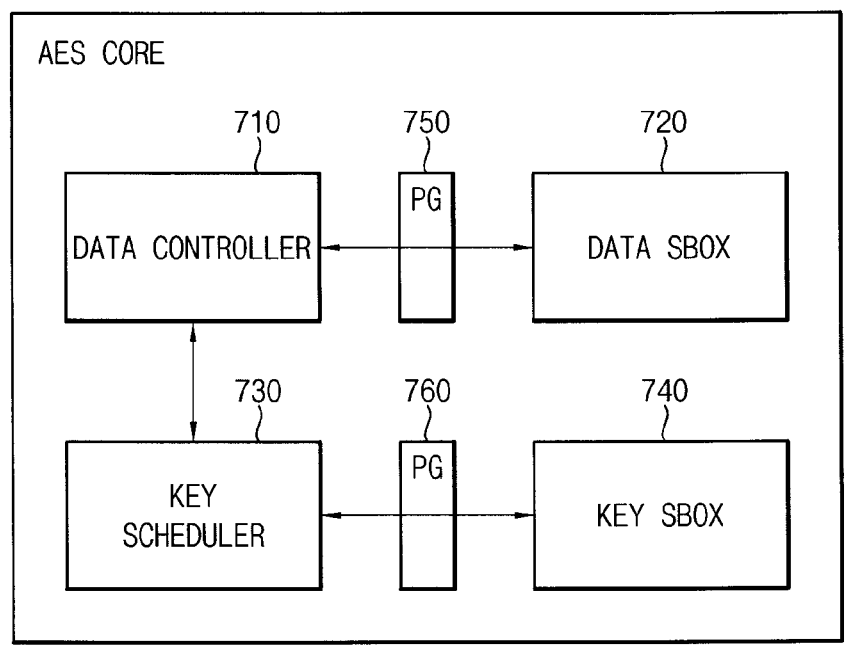
FIG. 38 is a block diagram illustrating an example of an AES core that is employed by an encryption/decryption device of FIG. 35.

FIG. 38 is a block diagram illustrating an example of an AES core that is employed by an encryption/decryption device of FIG. 35.

Referring to FIG. 38, the AES core 700 may include components of the key scheduling unit 510 (i.e., key scheduler 730 and key-sboxes 740), components of the block round unit 520 (i.e., data controller 710 and data-sboxes 720), and components of the random permutation generating unit 530 (i.e., random permutation generators 750 and 760). Generally, 16 data-sboxes 720 and/or 4 key-sboxes 740 need to be processed in each round. In addition, this processing needs to be completed in a predetermined number of cycles (e.g., 1 cycle through 16 cycles). As illustrated in FIG. 38, the random permutation generator 750 may be placed between the data controller 710 and the data-sboxes 720, and the random permutation generator 760 may be placed between the key scheduler 730 and the key-sboxes 740. The random permutation generator 750 may temporally and/or spatially randomize the processing of the data-sboxes 720. The random permutation generator 760 may temporally and/or spatially randomize the processing of the key-sboxes 740. Thus, the key scheduler 730 may provide a round key to the data controller 710, where the round key is generated by processing the key-sboxes 740. In addition, the data controller 710 may perform an XOR operation on the round key and data, where the data is generated by processing the data-sboxes 720.

Figure 39:
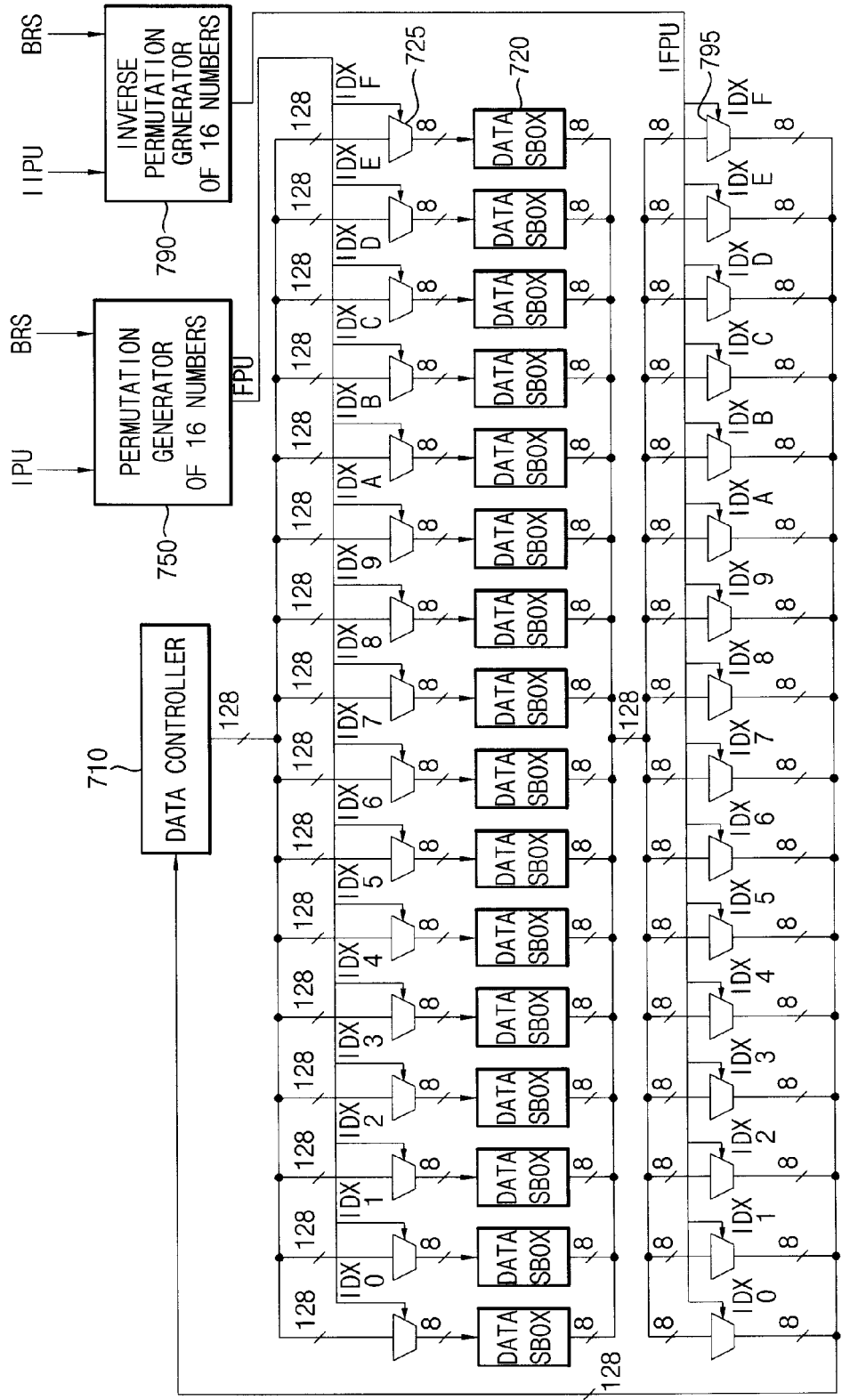
FIG. 39 is a diagram illustrating an example in which processing of data-sboxes is performed in an AES core of FIG. 38.

FIG. 39 is a diagram illustrating an example in which processing of data-sboxes is performed in an AES core of FIG. 38.

Referring to FIG. 39, it is illustrated that the AES core 700 of FIG. 38 simultaneously processes 16 data-sboxes 720. That is, the AES core 700 of FIG. 38 may include 16 data-sboxes 720. In detail, when the data controller 710 outputs block data of 128 bits, 16 multiplexers 725 may receive the block data of 128 bits, respectively. Here, a random permutation generator 750 may receive an initial permutation IPU and a binary random source BRS, and may output a final permutation FPU (i.e., a random permutation) to the 16 multiplexers 725 by performing a random arrangement operation (i.e., a rotation operation or a shuffle operation) on the initial permutation IPU based on a predetermined matrix using the binary random source BRS. When the final permutation FPU is input to the 16 multiplexers 725, the 16 multiplexers 725 may output the block data of 128 bits to 16 data-sboxes 720, respectively by 1 byte (i.e., by 8 bits). Here, the 16 data-sboxes 720 may be simultaneously processed by the AES core 700 of FIG. 38. However, since the processing of the 16 data-sboxes 720 is spatially randomized by the final permutation FPU, a high data security against an external attack such as Side Channel Analysis (SCA) may be achieved. Subsequently, the spatially randomized block data of 128 bits may be spatially inverse-randomized (i.e., restored) by an inverse random permutation generator 790 and 16 multiplexers 795, and then may be output to the data controller 710.

Figure 40:
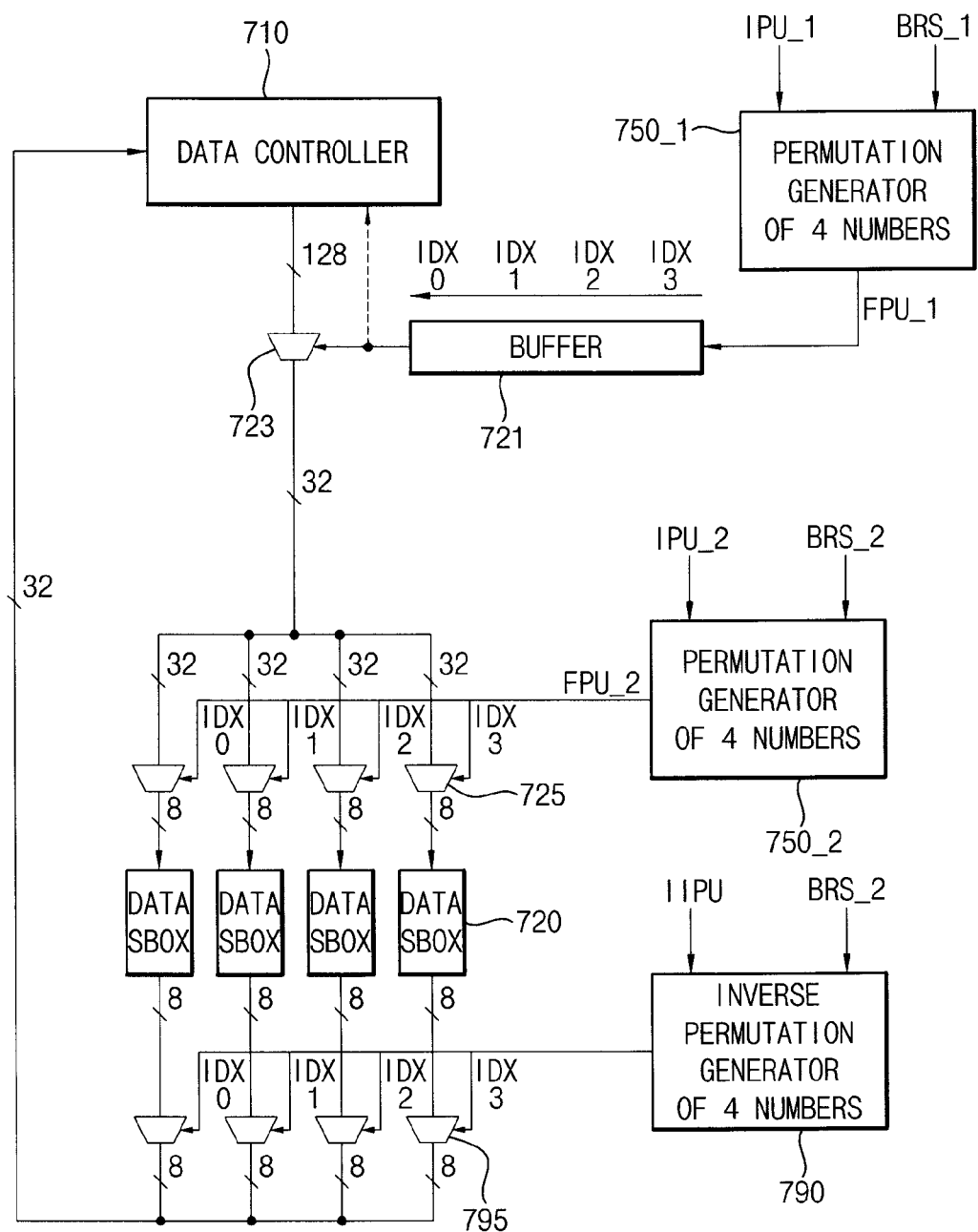
FIG. 40 is a diagram illustrating another example in which processing of data-sboxes is performed in an AES core of FIG. 38.

FIG. 40 is a diagram illustrating another example in which processing of data-sboxes is performed in an AES core of FIG. 38.

Referring to FIG. 40, it is illustrated that the AES core 700 of FIG. 38 simultaneously processes 4 data-sboxes 720. That is, the AES core 700 of FIG. 38 may include 4 data-sboxes 720. In detail, when the data controller 710 outputs block data of 128 bits, one multiplexer 723 may receive the block data of 128 bits. Here, a first random permutation generator 750_1 may receive a first initial permutation IPU_1 and a first binary random source BRS_1, and may output a first final permutation FPU_1 (i.e., a first random permutation) to the multiplexer 723 by performing a random arrangement operation (i.e., a rotation operation or a shuffle operation) on the first initial permutation IPU_1 based on a predetermined matrix using the first binary random source BRS_1. Since the first final permutation FPU_1 is sequentially input to the multiplexer 723 by a buffer 721, the multiplexer 723 may output the block data of 128 bits to 4 multiplexers 725 by 4 bytes (i.e., by 32 bits) based on the first final permutation FPU_1. That is, the processing of the 4 data-sboxes 720 may be temporally randomized by the first final permutation FPU_1. A second random permutation generator 750_2 may receive a second initial permutation IPU_2 and a second binary random source BRS_2, and may output a second final permutation FPU_2 (i.e., a second random permutation) to 4 multiplexers 725 by performing a random arrangement operation (i.e., a rotation operation or a shuffle operation) on the second initial permutation IPU_2 based on a predetermined matrix using the second binary random source BRS_2. Thus, when the second random permutation FPU_2 is input to the 4 multiplexers 725, the 4 multiplexers 725 may output the block data of 32 bits to 4 data-sboxes 720, respectively by 1 byte (i.e., 8 bits). Here, the 4 data-sboxes 720 may be simultaneously processed by the AES core 700 of FIG. 38. However, since the processing of the 4 data-sboxes 720 is spatially randomized by the second final permutation FPU_2, a high data security against an external attack such as Side Channel Analysis (SCA) may be achieved. Subsequently, the spatially randomized block data of 32 bits may be spatially inverse-randomized (i.e., restored) by an inverse random permutation generator 790 and 4 multiplexers 795, and then may be output to the data controller 710. Here, since an output of the buffer 721 is also output to the data controller 710, an inverse-randomization (i.e., restoration) may be temporally performed in the data controller 710.

Figure 41:
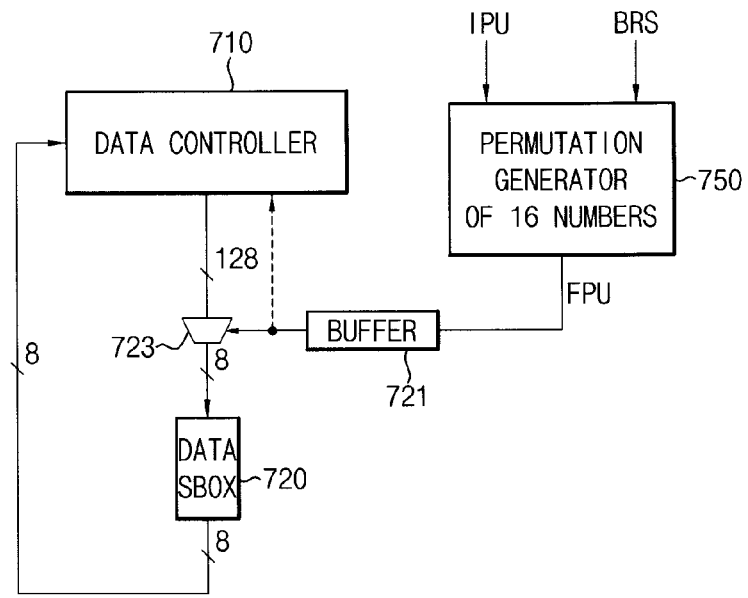
FIG. 41 is a diagram illustrating still another example in which processing of data-sboxes is performed in an AES core of FIG. 38.

FIG. 41 is a diagram illustrating still another example in which processing of data-sboxes is performed in an AES core of FIG. 38.

Referring to FIG. 41, it is illustrated that the AES core 700 of FIG. 38 processes one data-sbox 720. That is, the AES core 700 of FIG. 38 may include one data-sbox 720. In detail, when the data controller 710 outputs block data of 128 bits, one multiplexer 723 may receive the block data of 128 bits. Here, a random permutation generator 750 may receive an initial permutation IPU and a binary random source BRS, and may output a final permutation FPU (i.e., a random permutation) to the multiplexer 723 by performing a random arrangement operation (i.e., a rotation operation or a shuffle operation) on the initial permutation IPU based on a predetermined matrix using the binary random source BRS. Since the final permutation FPU is sequentially input to the multiplexer 723 by a buffer 721, the multiplexer 723 may sequentially output the block data of 128 bits to the data-sbox 720 by 1 byte (i.e., by 8 bits) based on the final permutation FPU. As described above, although one data-sbox 720 is processed by the AES core 700 of FIG. 38, a high data security against an external attack such as Side Channel Analysis (SCA) may be achieved because the processing of the data-sbox 720 is temporally randomized by the final permutation FPU. In addition, since an output of the buffer 721 is output to the data controller 710, an inverse-randomization (i.e., restoration) may be temporally performed in the data controller 710.

Figure 42:
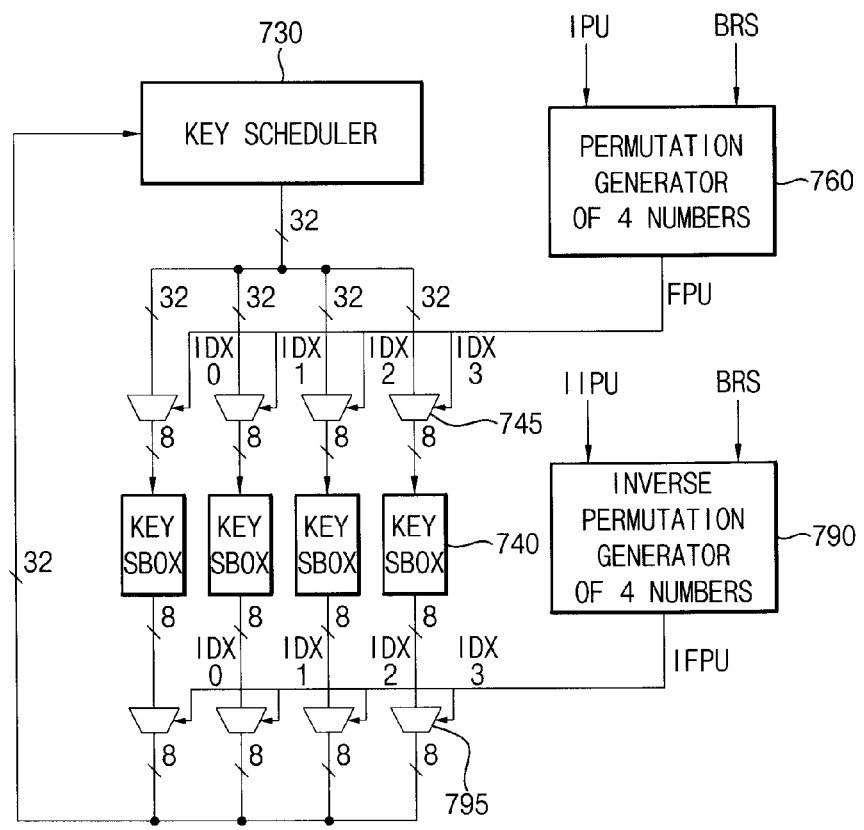
FIG. 42 is a diagram illustrating an example in which processing of key-sboxes is performed in an AES core of FIG. 38.

FIG. 42 is a diagram illustrating an example in which processing of key-sboxes is performed in an AES core of FIG. 38.

Referring to FIG. 42, it is illustrated that the AES core 700 of FIG. 38 simultaneously processes 4 key-sboxes 740. That is, the AES core 700 of FIG. 38 may include 4 key-sboxes 740. In detail, when the key scheduler 730 outputs a round key of 32 bits, 4 multiplexers 745 may receive the round key of 32 bits, respectively. Here, a random permutation generator 760 may receive an initial permutation IPU and a binary random source BRS, and may output a final permutation FPU (i.e., a random permutation) to the 4 multiplexers 745 by performing a random arrangement operation (i.e., a rotation operation or a shuffle operation) on the initial permutation IPU based on a predetermined matrix using the binary random source BRS. When the final permutation FPU is input to the 4 multiplexers 745, the 4 multiplexers 745 may output the round key of 32 bits to 4 key-sboxes 740, respectively by 1 byte (i.e., by 8 bits). Here, the 4 key-sboxes 740 may be simultaneously processed by the AES core 700 of FIG. 38. However, since the processing of the 4 key-sboxes 740 is spatially randomized by the final permutation FPU, a high data security against an external attack such as Side Channel Analysis (SCA) may be achieved. Subsequently, the spatially randomized round key of 32 bits may be spatially inverse-randomized (i.e., restored) by an inverse random permutation generator 790 and 4 multiplexers 795, and then may be output to the key scheduler 730.

Figure 43:
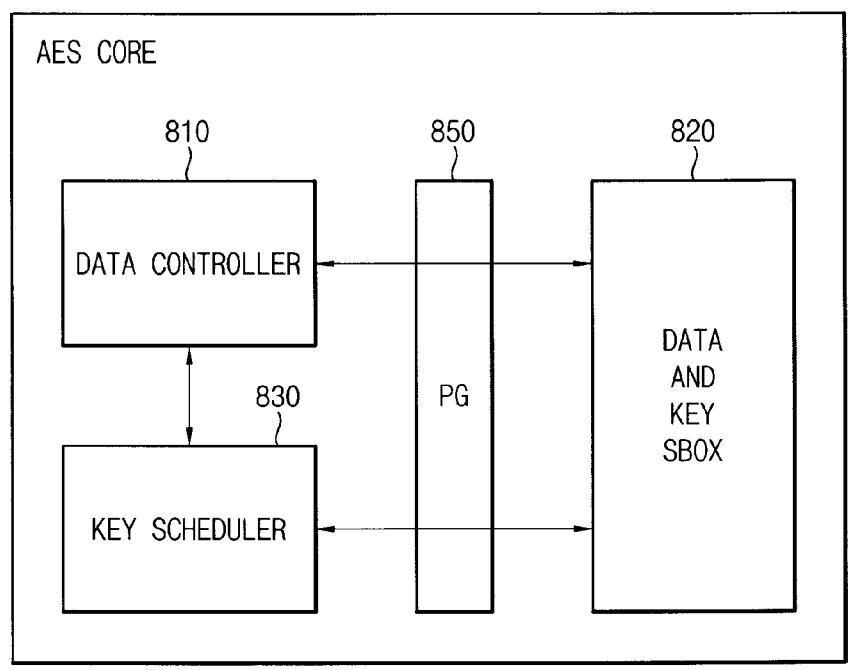
FIG. 43 is a block diagram illustrating another example of an AES core that is employed by an encryption/decryption device of FIG. 35.
Figure 44:
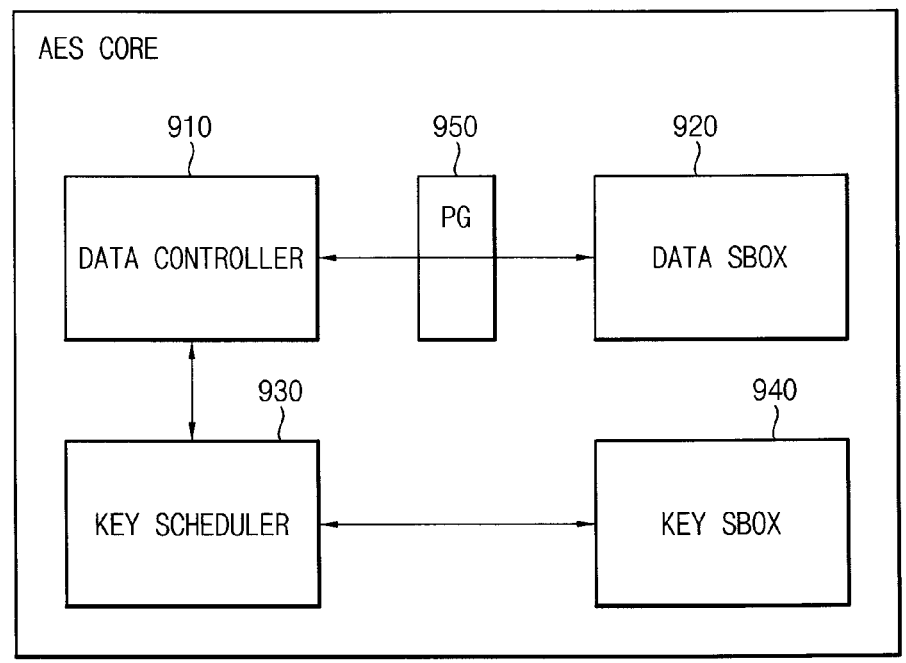
FIG. 44 is a block diagram illustrating still another example of an AES core that is employed by an encryption/decryption device of FIG. 35.
Figure 45:
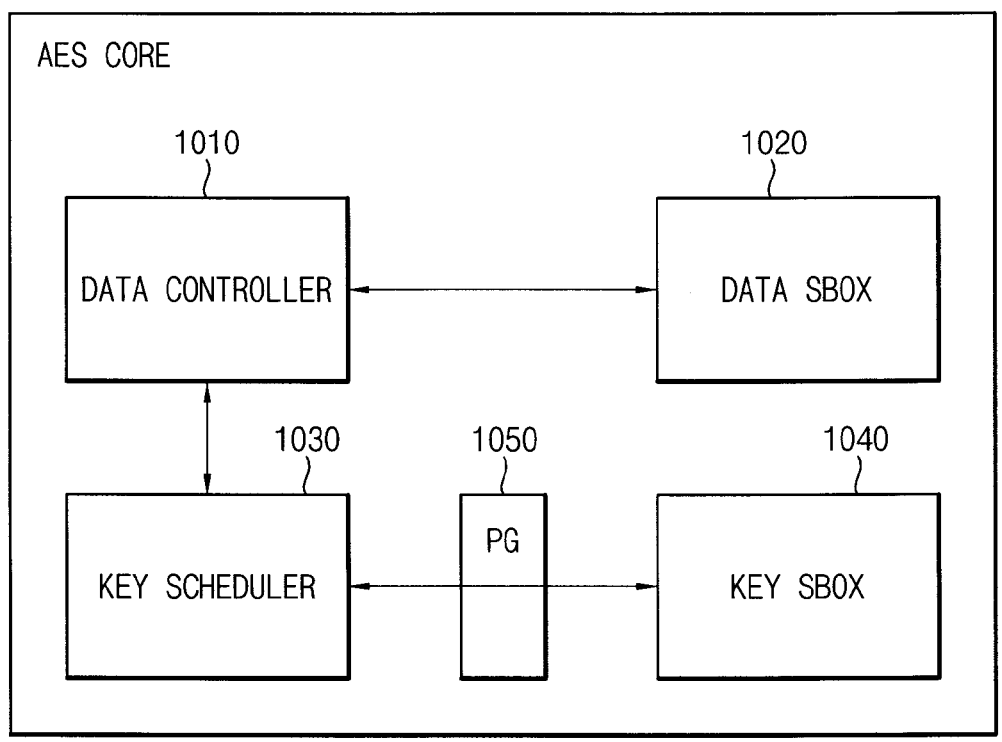
FIG. 45 is a block diagram illustrating still another example of an AES core that is employed by an encryption/decryption device of FIG. 35.

FIG. 43 is a block diagram illustrating another example of an AES core that is employed by an encryption/decryption device of FIG. 35. FIG. 44 is a block diagram illustrating still another example of an AES core that is employed by an encryption/decryption device of FIG. 35. FIG. 45 is a block diagram illustrating still another example of an AES core that is employed by an encryption/decryption device of FIG. 35.

Referring to FIG. 43, the AES core 800 may include components of the key scheduling unit 510 (i.e., key scheduler 830), components of the block round unit 520 (i.e., data controller 810), and components of the random permutation generating unit 530 (i.e., random permutation generator 850). Here, the AES core 800 may include data and key-sboxes 820 corresponding to data-sboxes and key-sboxes, and may temporally and/or spatially randomize processing of the data-sboxes and processing of the key-sboxes. Referring to FIG. 44, the AES core 900 may include components of the key scheduling unit 510 (i.e., key scheduler 930 and key-sboxes 940), components of the block round unit 520 (i.e., data controller 910 and data-sboxes 920), and components of the random permutation generating unit 530 (i.e., random permutation generator 950). Here, the AES core 900 may temporally and/or spatially randomize processing of the data-sboxes 920. Referring to FIG. 45, the AES core 1000 may include components of the key scheduling unit 510 (i.e., key scheduler 1030 and key-sboxes 1040), components of the block round unit 520 (i.e., data controller 1010 and data-sboxes 1020), and components of the random permutation generating unit 530 (i.e., random permutation generator 1050). Here, the AES core 1000 may temporally and/or spatially randomize processing of the key-sboxes 1040. As described above, the AES cores 800, 900, and 1000 applied to the encryption/decryption device 500 of FIG. 35 may include the random permutation generators 850, 950, and 1010, respectively. In addition, the random permutation generators 850, 950, and 1010 may randomize processing of data-sboxes and/or processing of key-sboxes.

Figure 46:
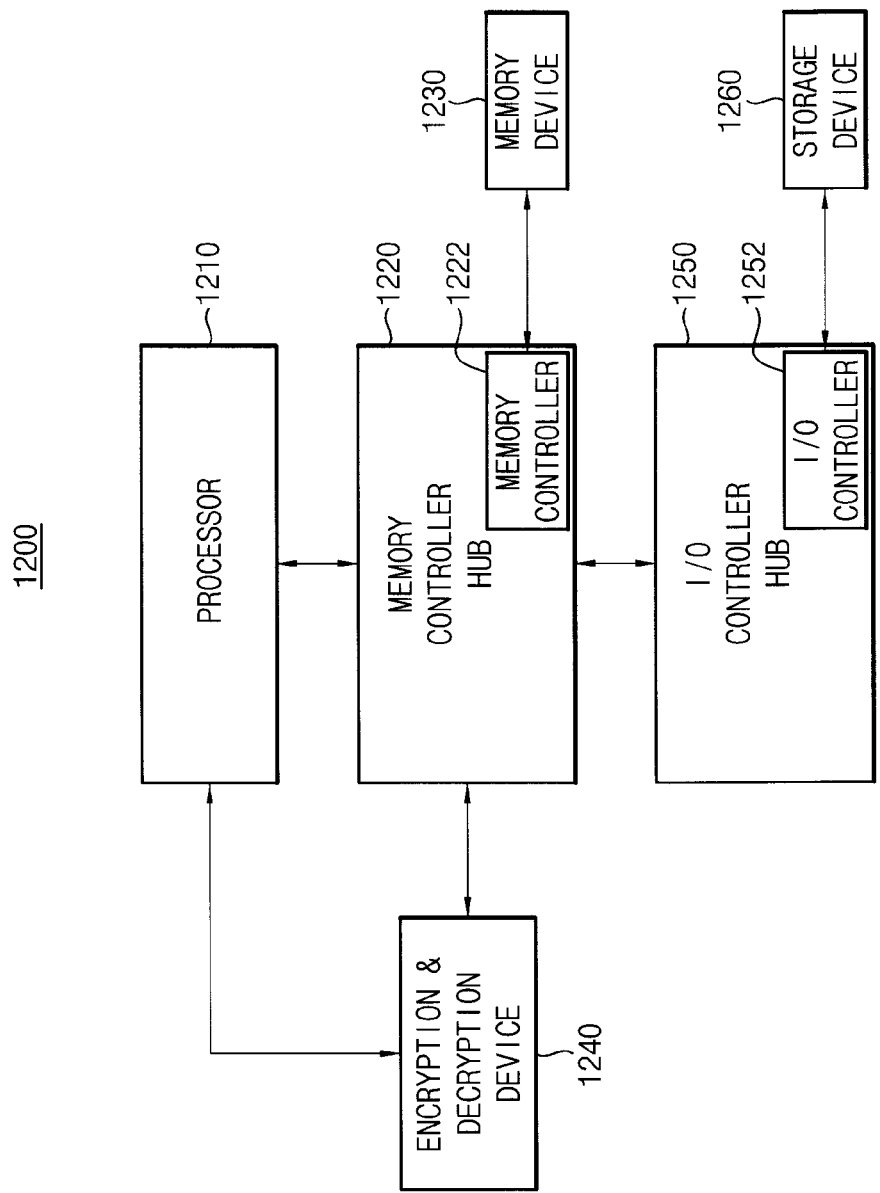
FIG. 46 is a block diagram illustrating an example of a computing system having an encryption/decryption device of FIG. 35.

FIG. 46 is a block diagram illustrating an example of a computing system having an encryption/decryption device of FIG. 35.

Figure 48:
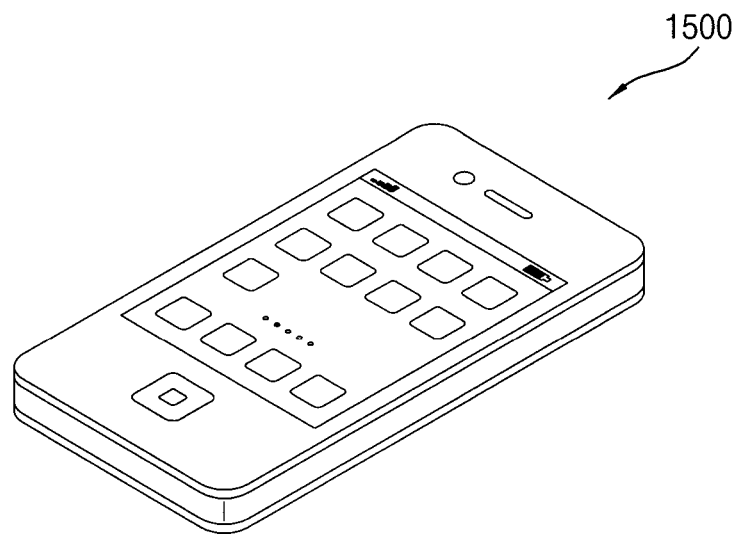
FIG. 48 is a diagram illustrating an example of a smartphone having an encryption/decryption device of FIG. 35.
Figure 49:
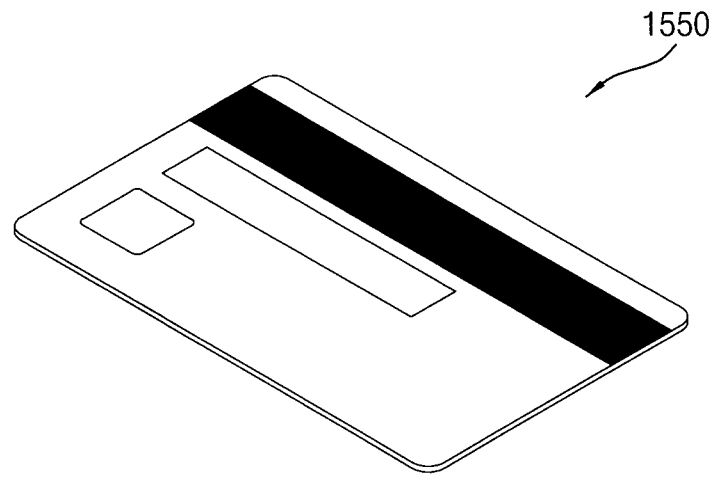
FIG. 49 is a diagram illustrating an example of a smart-card having an encryption/decryption device of FIG. 35.

Referring to FIG. 46, the computing system 1200 may include a processor 1210, a memory controller hub 1220, a memory device 1230, an encryption/decryption device 1240, an input/output (I/O) controller hub 1250, and a storage device 1260. Here, the memory controller hub 1220 may include a memory controller 1222, and the I/O controller hub 1250 may include an I/O controller 1252. In one exemplary embodiment, the computing system 1200 may be implemented as a smart-phone 1500 of FIG. 48. In another exemplary embodiment, the computing system 1200 may be implemented as a smart-card 1550 of FIG. 49. However, the computing system 1200 is not limited thereto. For example, the computing system 1200 may include a mobile device such as a cellular phone, an electric device such as a television, etc.

The processor 1210 may perform various computing functions. The processor 1210 may be a micro processor, a central processing unit (CPU), etc. The processor 1210 may be coupled to the memory controller hub 1220 via a system bus such as an address bus, a control bus, a data bus, etc. Further, the processor 1210 may be coupled to an extended bus such as a peripheral component interconnection (PCI) bus. The memory controller hub 1220 may control communications between the processor 1210 and the memory device 1230 using the memory controller 1222. The memory device 1230 may store data for operations of the computing system 1200. For example, the memory device 1230 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The encryption/decryption device 1240 may encrypt or decrypt data for operations of the computing system 1200. For this operation, the encryption/decryption device 1240 may include a key scheduling unit, a block round unit, a random permutation generating unit, and an AES controller unit. Since the encryption/decryption device 1240 is described above, duplicated descriptions will be omitted below. In one exemplary embodiment, the encryption/decryption device 1240 may be implemented by hardware. In another exemplary embodiment, the encryption/decryption device 1240 may be implemented by software. In this case, the processor 1210 may execute commands of the software. The I/O controller hub 1250 may control I/O devices using the I/O controller 1252. For example, as illustrated in FIG. 46, the I/O controller hub 1250 may control communications between the memory controller hub 1220 and the storage device 1260. Here, the I/O controller hub 1250 may be coupled to the memory controller hub 1220 using a high speed chip-to-chip connection such as a direct media interface (DMI). The storage device 1260 may be a solid state drive (SSD) device, a hard disk drive (HDD) device, a redundant array of independent disk (RAID), etc. Here, the storage device 1260 may communicate with the I/O controller hub 1250 using a serial storage protocol such as a serial attach SCSI (SAS), serial advanced technology attachment (SATA), etc.

When the computing system 1200 is manufactured as a mobile device, the computing system 1200 may be implemented by various packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP).

Figure 47:
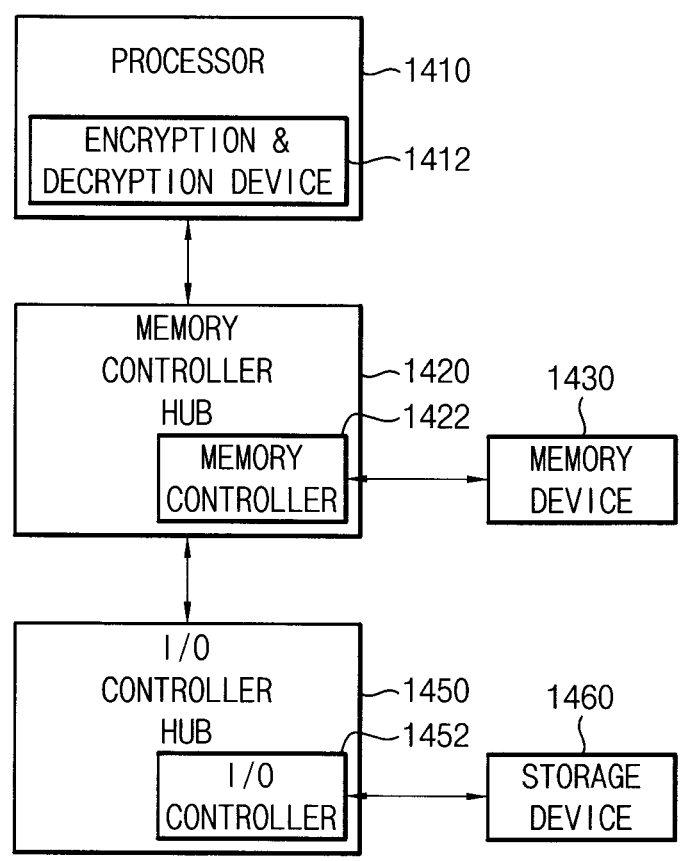
FIG. 47 is a block diagram illustrating another example of a computing system having an encryption/decryption device of FIG. 35.

FIG. 47 is a block diagram illustrating another example of a computing system having an encryption/decryption device of FIG. 35.

Referring to FIG. 47, the computing system 1400 may include a processor 1410, a memory controller hub 1420, a memory device 1430, an I/O controller hub 1450, and a storage device 1460. Here, the processor 1410 may include an encryption/decryption device 1412, the memory controller hub 1420 may include a memory controller 1422, and the I/O controller hub 1450 may include an I/O controller 1452. In one exemplary embodiment, the computing system 1400 may be implemented as a smart-phone 1500 of FIG. 48. In another exemplary embodiment, the computing system 1400 may be implemented as a smart-card 1550 of FIG. 49. However, the computing system 1400 is not limited thereto. For example, the computing system 1400 may include a mobile device such as a cellular phone, an electric device such as a television, etc. The encryption/decryption device 1412 may encrypt or decrypt data for operations of the computing system 1400. For this operation, the encryption/decryption device 1412 may include a key scheduling unit, a block round unit, a random permutation generating unit, and an AES controller unit. Since the encryption/decryption device 1412 is described above, duplicated descriptions will be omitted below. In one exemplary embodiment, the encryption/decryption device 1412 may be implemented by hardware. In another exemplary embodiment, the encryption/decryption device 1412 may be implemented by software. In this case, the processor 1410 may execute commands of the software.

The present exemplary embodiments may be applied to a device (e.g., an encryption/decryption device, etc) that uses a random permutation, and a computing system (e.g., an electric device, a mobile device, etc) having the device. For example, the exemplary embodiments concept may be applied to a computer, a laptop, a cellular phone, a smart-phone, a smart-pad, a security system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the disclosure concept as defined in the claims. Therefore, it is to be understood that the foregoing is illustrative of various exemplary embodiments and is not to be construed as limited to the specific exemplary embodiments disclosed, and that modifications to the disclosed example embodiments, as well as other example embodiments, are intended to be included within the scope of the appended claims.

What is claimed is:

1. A method of generating a random permutation, the method comprising:
arranging a sequence of N numbers in a matrix, where N is an integer equal to or greater than 2;
generating, by at least one processor, a first changed matrix by performing a first random arrangement operation on the N numbers in each row of the matrix, the first random arrangement operation performed based on a row random number;
generating, by the at least one processor, a second changed matrix by performing a second random arrangement operation on the N numbers in each column of the first changed matrix, the second random arrangement operation performed based on a column random number; and
outputting, by the at least one processor, the N numbers arranged in the second changed matrix according to rows or columns of the second changed matrix as a rearranged sequence of the sequence of N numbers.

2. The method of claim 1, wherein the N numbers have a binary form.

3. The method of claim 1, wherein the matrix is one of a square matrix and a rectangular matrix.

4. The method of claim 3, wherein the generating the first changed matrix comprises:
rotating the N numbers arranged in each row of the matrix by the row random number in a row direction of the matrix, and
wherein the generating the second changed matrix comprises:
rotating the N numbers arranged in each column of the first changed matrix by the column random number in a column direction of the first changed matrix.

5. The method of claim 4, wherein the row random number is independently selected for each row of the matrix.

6. The method of claim 5, wherein a range of the row random number is between 0 and $2^{\lceil log_2 j \rceil}-1$, where j is a quantity of the N numbers arranged in each row of the matrix.

7. The method of claim 4, wherein the column random number is independently selected for each column of the first changed matrix.

8. The method of claim 7, wherein a range of the column random number is between 0 and $2^{\lceil log_2 k \rceil}-1$, where k is a quantity of the N numbers arranged in each column of the first changed matrix.

9. The method of claim 3, wherein N is an integer greater than or equal to 4, wherein the generating the first changed matrix comprises:
generating a plurality of row sub-matrixes by arranging the N numbers of each row of the matrix in at least one row and at least one column of the plurality of row sub-matrixes;
generating a plurality of changed row sub-matrixes by performing a rotation operation on the N numbers in each row and each column of each of the plurality of row sub-matrixes; and
outputting the N numbers arranged in each of the plurality of changed row sub-matrixes as each row of the first changed matrix, and
wherein the generating the second changed matrix comprises:
generating a plurality of column sub-matrixes by arranging the N numbers of each column of the first changed matrix in at least one row and at least one column of the plurality of column sub-matrixes;
generating a plurality of changed column sub-matrixes by performing a rotation operation on the N numbers in each row and each column of each of the plurality of column sub-matrixes; and
outputting the N numbers arranged in each of the plurality of changed column sub-matrixes as each column of the second changed matrix.

10. A method of generating a random permutation, the method comprising:
arranging a sequence of N numbers in a matrix, where N is an integer equal to or greater than 2;
generating, by at least one processor, a first changed matrix by performing a first random arrangement operation on the N numbers in each row of the matrix, the first random arrangement operation performed based on a first row random number;

generating, by the at least one processor, a second changed matrix corresponding to a transposed matrix of the first changed matrix;

generating, by the at least one processor, a third changed matrix by performing a second random arrangement operation on the N numbers in each row of the second changed matrix, the second random arrangement operation performed based on a second row random number;

generating, by the at least one processor, a fourth changed matrix corresponding to a transposed matrix of the third changed matrix; and outputting, by the at least one processor, the N numbers arranged in the fourth changed matrix according to rows or columns of the fourth changed matrix as a rearranged sequence of the sequence of N numbers.

11. The method of claim 10, wherein the matrix is one of a square matrix and a rectangular matrix.

12. The method of claim 11, wherein generating the first changed matrix comprises:

rotating the N numbers arranged in each row of the matrix by the first row random number in a row direction of the matrix, and wherein generating the third changed matrix comprises:

rotating the N numbers arranged in each row of the second changed matrix by the second row random number in the row direction of the second changed matrix.

13. The method of claim 12, wherein the first row random number is independently selected for each row of the matrix, and wherein the second row random number is independently selected for each row of the second changed matrix.

14. The method of claim 11, wherein N is an integer greater than or equal to 4, wherein the generating the first changed matrix comprises:

generating a plurality of first sub-matrixes by arranging the N numbers of each row of the matrix in at least one row and at least one column of the plurality of first sub-matrixes;

generating a plurality of first changed sub-matrixes by performing a rotation operation on the N numbers in each row and each column of each of the plurality of first sub-matrixes; and outputting the N numbers arranged in each of the plurality of first changed sub-matrixes as each row of the first changed matrix, and wherein the generating the third changed matrix comprises:

generating a plurality of second sub-matrixes by arranging the N numbers of each row of the second changed matrix in at least one row and at least one column of the plurality of second sub-matrixes;

generating a plurality of second changed sub-matrixes by performing a rotation operation on the N numbers in each row and each column of each of the plurality of second sub-matrixes; and outputting the N numbers arranged in each of the plurality of second changed sub-matrixes as each row of the third changed matrix.

15. A random permutation generating device comprising:

a permutation input unit configured to receive an initial permutation sequence of N numbers, where N is an integer equal to or greater than 2 and configured to arrange the N numbers of the initial permutation sequence in a matrix;

a first matrix change unit configured to generate a first changed matrix by performing a first random arrangement operation on the N numbers in each row of the matrix, the first random arrangement operation performed based on a row random number;

a second matrix change unit configured to generate a second changed matrix by performing a second random arrangement operation on the N numbers in each column of the first changed matrix, the second random arrangement operation performed based on a column random number; and a permutation output unit configured to generate a final permutation sequence of the N numbers by outputting the N numbers arranged in the second changed matrix according to rows or columns of the second changed matrix as the final permutation sequence that is a rearranged sequence of the initial permutation sequence.

16. The device of claim 15, wherein the first matrix change unit rotates the N numbers arranged in each row of the matrix by the row random number in a row direction of the matrix, the row random number being independently selected for each row of the matrix, and wherein the second matrix change unit rotates the N numbers arranged in each column of the first changed matrix by the column random number in a column direction of the first changed matrix, the column random number being independently selected for each column of the first changed matrix.

17. The device of claim 15, wherein N is an integer greater than or equal to 4, wherein the first matrix change unit generates a plurality of row sub-matrixes by arranging the N numbers of each row of the matrix in at least one row and at least one column of the plurality of row sub-matrixes, generates a plurality of changed row sub-matrixes by performing a rotation operation on the N numbers in each row and each column of each of the plurality of row sub-matrixes, and outputs the N numbers arranged in each of the plurality of changed row sub-matrixes as each row of the first changed matrix, and wherein the second matrix change unit generates a plurality of column sub-matrixes by arranging the N numbers of each column of the first changed matrix in at least one row and at least one column of the plurality of column sub-matrixes, generates a plurality of changed column sub-matrixes by performing a rotation operation on the N numbers in each row and each column of each of the plurality of column sub-matrixes, and outputs the N numbers arranged in each of the plurality of changed column sub-matrixes as each column of the second changed matrix.

18. A random permutation generating device comprising:

a permutation input unit configured to receive an initial permutation sequence of N numbers, where N is an integer equal to or greater than 2, and configured to arrange the N numbers of the initial permutation sequence in a matrix;

a first matrix change unit configured to generate a first changed matrix by performing a first random arrangement operation on the N numbers in each row of the matrix, the first random arrangement operation performed based on a first row random number;

a first matrix transpose unit configured to generate a second changed matrix corresponding to a transposed matrix of the first changed matrix;

a second matrix change unit configured to generate a third changed matrix by performing a second random arrangement operation on the N numbers in each row of the second changed matrix, the second random arrangement operation performed based on a second row random number;

a second matrix transpose unit configured to generate a fourth changed matrix corresponding to a transposed matrix of the third changed matrix; and a permutation output unit configured to generate a final permutation sequence of the N numbers by outputting the N numbers arranged in the fourth changed matrix according to rows or columns of the fourth changed matrix as the final permutation sequence that is a rearranged sequence of the initial permutation sequence.

19. The device of claim 18, wherein the first matrix change unit rotates the N numbers arranged in each row of the matrix by the first row random number in a row direction of the matrix, the first row random number being independently selected for each row of the matrix, and wherein the second matrix change unit rotates the N numbers arranged in each row of the second changed matrix by the second row random number in the row direction of the second changed matrix, the second row random number being independently selected for each row of the second changed matrix.

20. The device of claim 18, wherein the first matrix change unit generates a plurality of first sub-matrixes by arranging the N numbers of each row of the matrix in at least one row and at least one column of the plurality of first sub-matrixes, generates a plurality of first changed sub-matrixes by performing a rotation operation on the N numbers in each row and each column of each of the plurality of first sub-matrixes, and outputs the N numbers arranged in each of the plurality of first changed sub-matrixes as each row of the first changed matrix, and wherein the second matrix change unit generates a plurality of second sub-matrixes by arranging the N numbers of each row of the second changed matrix in at least one row and at least one column of the plurality of second sub-matrixes, generates a plurality of second changed sub-matrixes by performing a rotation operation on the N numbers in each row and each column of each of the plurality of second sub-matrixes, and outputs the N numbers arranged in each of the plurality of second changed sub-matrixes as each row of the third changed matrix.

21. An encryption/decryption device comprising:

a key scheduling unit configured to generate a plurality of round keys based on an input key, the round keys for performing each of a plurality of encryption/decryption rounds;

a block round unit configured to encrypt a plain text or decrypt an encrypted text by performing the plurality of encryption/decryption rounds based on the plurality of round keys;

a random permutation generating unit configured to spatially randomize processing of key-sboxes in the key scheduling unit or processing of data-sboxes in the block round unit by performing a random arrangement operation on an initial permutation sequence of N numbers using a matrix to generate a final permutation sequence of the N numbers that is a rearranged sequence of the initial permutation sequence; and an advanced encryption standard (AES) controller unit configured to control the key scheduling unit, the block round unit, and the random permutation generating unit based on an AES algorithm.

22. The device of claim 21, wherein the random permutation generating unit temporally randomizes the processing of the key-sboxes in the key scheduling unit or the processing of the data-sboxes in the block round unit.

23. The device of claim 21, wherein the random permutation generating unit includes:

a permutation input unit configured to receive the initial permutation having the N numbers, where N is an integer equal to or greater than 2 configured to arrange the N numbers of the initial permutation sequence in the matrix;

a first matrix change unit configured to generate a first changed matrix by performing a first random arrangement operation on the N numbers in each row of the predetermined matrix, the first random arrangement operation performed based on a row random number;

a second matrix change unit configured to generate a second changed matrix by performing a second random arrangement operation on the N numbers in each column of the first changed matrix, the second random arrangement operation performed based on a column random number; and a permutation output unit configured to generate the final permutation sequence of the N numbers by outputting the N numbers arranged in the second changed matrix according to rows or columns of the second changed matrix as the final permutation sequence.

24. The device of claim 21, wherein the random permutation generating unit includes:

a permutation input unit configured to receive the initial permutation sequence having the N numbers, where N is an integer equal to or greater than 2, and configured to arrange the N numbers of the initial permutation sequence in the matrix;

a first matrix change unit configured to generate a first changed matrix by performing a first random arrangement operation on the N numbers in each row of the predetermined matrix, the first random arrangement operation performed based on a first row random number;

a first matrix transpose unit configured to generate a second changed matrix corresponding to a transposed matrix of the first changed matrix;

a second matrix change unit configured to generate a third changed matrix by performing a second random arrangement operation on the N numbers in each row of the second changed matrix, the second random arrangement operation performed based on a second row random number;

a second matrix transpose unit configured to generate a fourth changed matrix corresponding to a transposed matrix of the third changed matrix; and a permutation output unit configured to generate the final permutation sequence of the N numbers by outputting the N numbers arranged in the fourth changed matrix according to rows or columns of the fourth changed matrix as the final permutation sequence.

* * * * *